US012562819B2

(12) United States Patent
Zhang et al.

(10) Patent No.: US 12,562,819 B2
(45) Date of Patent: Feb. 24, 2026

(54) COMMUNICATION METHOD, APPARATUS AND SYSTEM, AND STORAGE MEDIUM

(71) Applicant: Beijing Xiaomi Mobile Software Co., Ltd., Beijing (CN)

(72) Inventors: Yong Zhang, Beijing (CN); Xinlin Yi, Beijing (CN); Ningzhi Zhu, Beijing (CN); Runyu Shi, Beijing (CN); Kai Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 291 days.

(21) Appl. No.: 18/146,268

(22) Filed: Dec. 23, 2022

(65) Prior Publication Data

US 2024/0106546 A1 Mar. 28, 2024

(30) Foreign Application Priority Data

Sep. 23, 2022 (CN) .......................... 202211167771.0

(51) Int. Cl.
*H04B 11/00* (2006.01)
*G05B 19/042* (2006.01)
(52) U.S. Cl.
CPC ........... *H04B 11/00* (2013.01); *G05B 19/042* (2013.01); *G05B 2219/2642* (2013.01)
(58) Field of Classification Search
CPC ..... G01S 5/22; G01S 3/80; G01S 1/80; H04R 2420/07; H04R 3/12; H04R 2227/005; G05B 19/042; G05B 2219/2642; H04B 11/00; H04J 3/0635; H04J 3/0658; H04W 4/021; H04W 4/02; H04W 4/33
USPC ....................................................... 367/117
See application file for complete search history.

(56) References Cited

U.S. PATENT DOCUMENTS

| | | | | |
|---|---|---|---|---|
| 9,693,164 B1 * | 6/2017 | Kadri | ...................... | H04R 1/406 |
| 9,967,437 B1 * | 5/2018 | Meyers | ............. | H04N 21/4302 |
| 10,182,414 B2 * | 1/2019 | Qiu | ...................... | H04W 64/006 |
| 10,700,791 B2 * | 6/2020 | Al-Mousa | ............. | H04B 11/00 |
| 2002/0105970 A1 | 8/2002 | Shvodian | | |
| 2014/0247819 A1 | 9/2014 | Zhou et al. | | |
| 2015/0131539 A1 * | 5/2015 | Tsfaty | ................... | H04B 11/00 |
| | | | | 370/329 |
| 2016/0157285 A1 * | 6/2016 | Tabata | .................. | H04W 12/50 |
| | | | | 370/350 |

(Continued)

FOREIGN PATENT DOCUMENTS

| | | | | |
|---|---|---|---|---|
| CN | 112104929 A | * 12/2020 | .............. | H04R 1/02 |
| JP | 2015175713 A | * 10/2015 | | |
| WO | 2015055894 A1 | 4/2015 | | |

OTHER PUBLICATIONS

CN-112104929-A (machine translation) (Year: 2020).*
JP-2015175713-A (machine translation) (Year: 2015).*

*Primary Examiner* — Yuqing Xiao
*Assistant Examiner* — Christopher Richard Walker
(74) *Attorney, Agent, or Firm* — McCoy Russell LLP

(57) ABSTRACT

A communication method, applied to a master device, includes: determining, according to the number of controlled devices and a preset time slot length, detection cycles and detection timing of various controlled devices in a detection cycle; receiving, in a time slot in the detection cycle, an ultrasonic sweep signal sent by the controlled device; and determining, according to the detection timing and the ultrasonic sweep signal, a detection result of the master device and a controlled device.

17 Claims, 15 Drawing Sheets

(56) References Cited

U.S. PATENT DOCUMENTS

| 2017/0071017 | A1* | 3/2017 | Klemans | ............... | H04W 4/80 |
| 2021/0398551 | A1 | 12/2021 | Nandy et al. | | |
| 2023/0194654 | A1* | 6/2023 | Weksler | ............... | G08B 1/08 |
| | | | | | 367/129 |

* cited by examiner

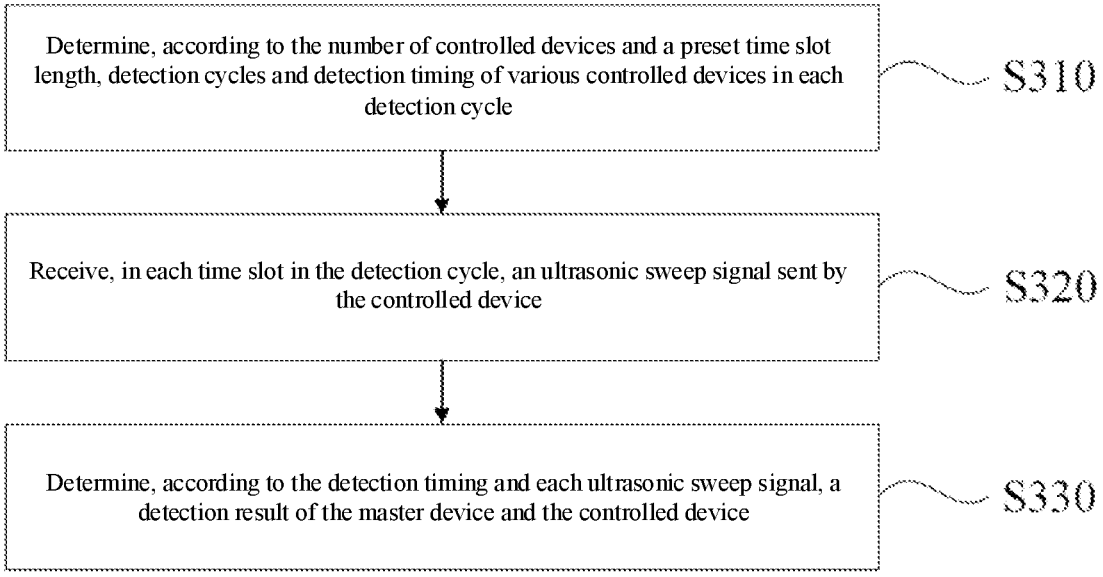

Determine, according to the number of controlled devices and a preset time slot length, detection cycles and detection timing of various controlled devices in each detection cycle    S310

Receive, in each time slot in the detection cycle, an ultrasonic sweep signal sent by the controlled device    S320

Determine, according to the detection timing and each ultrasonic sweep signal, a detection result of the master device and the controlled device    S330

FIG. 3

Determine, according to the detection timing, a target controlled device corresponding to the timing in each time slot ~ S510

Determine, according to the ultrasonic sweep signal received in the time slot, the detection result of the master device and the target controlled device ~ S520

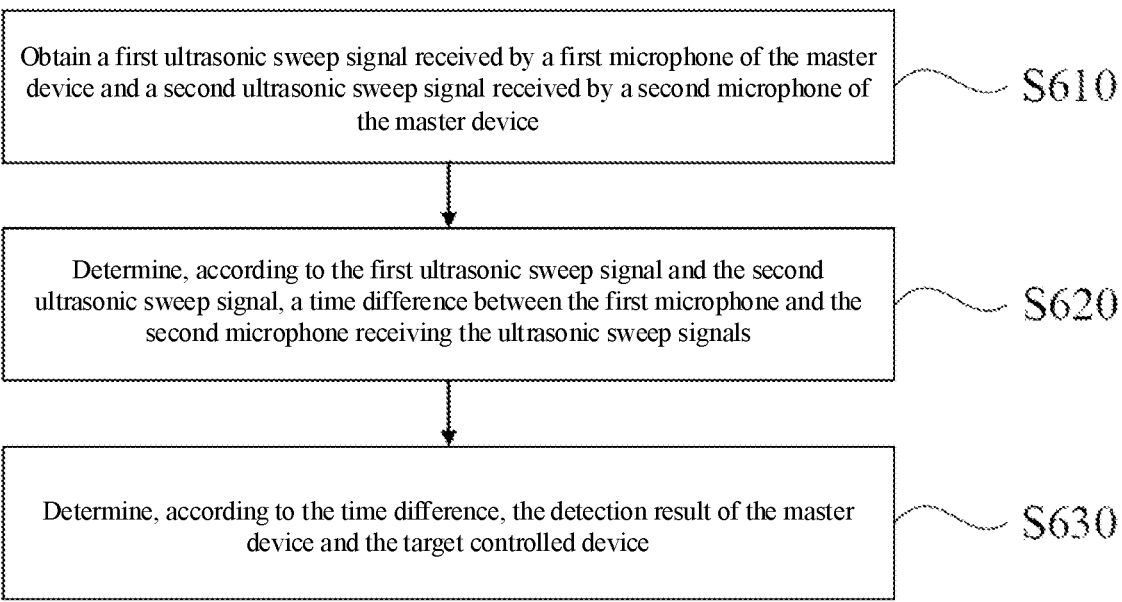

Obtain a first ultrasonic sweep signal received by a first microphone of the master device and a second ultrasonic sweep signal received by a second microphone of the master device                                                                    S610

Determine, according to the first ultrasonic sweep signal and the second ultrasonic sweep signal, a time difference between the first microphone and the second microphone receiving the ultrasonic sweep signals                                          S620

Determine, according to the time difference, the detection result of the master device and the target controlled device                                                                                                                                 S630

FIG. 6

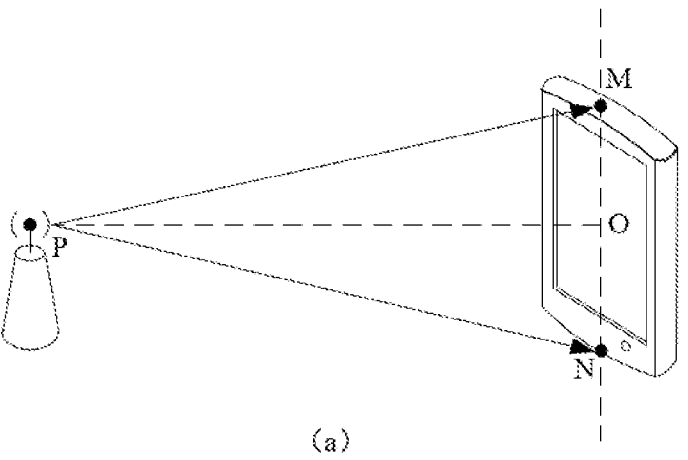
(a)
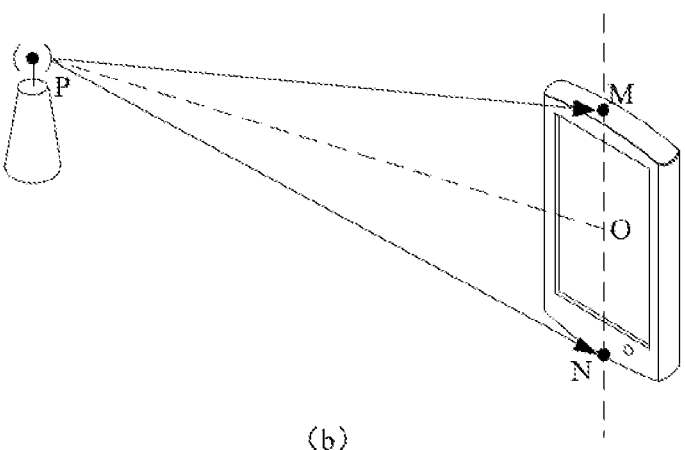
(b)
FIG. 7

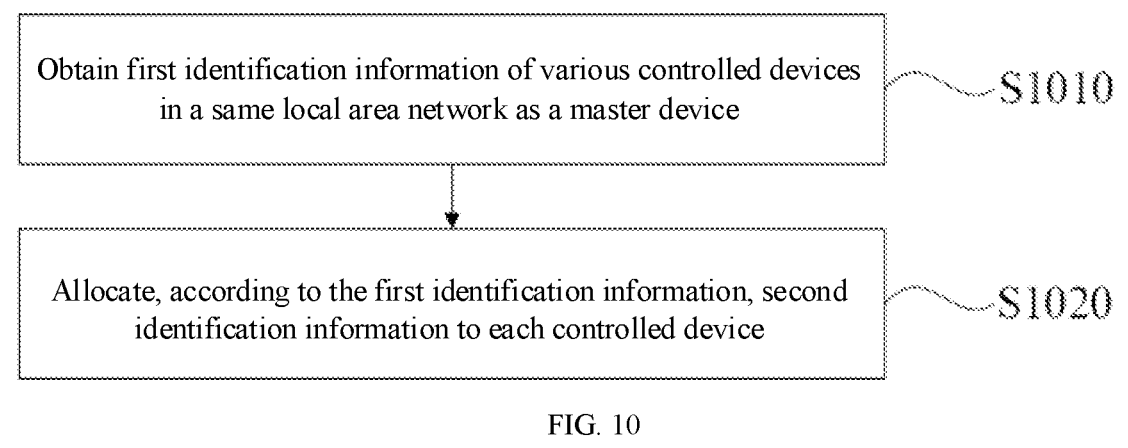

Obtain first identification information of various controlled devices in a same local area network as a master device — S1010

Allocate, according to the first identification information, second identification information to each controlled device — S1020

FIG. 10

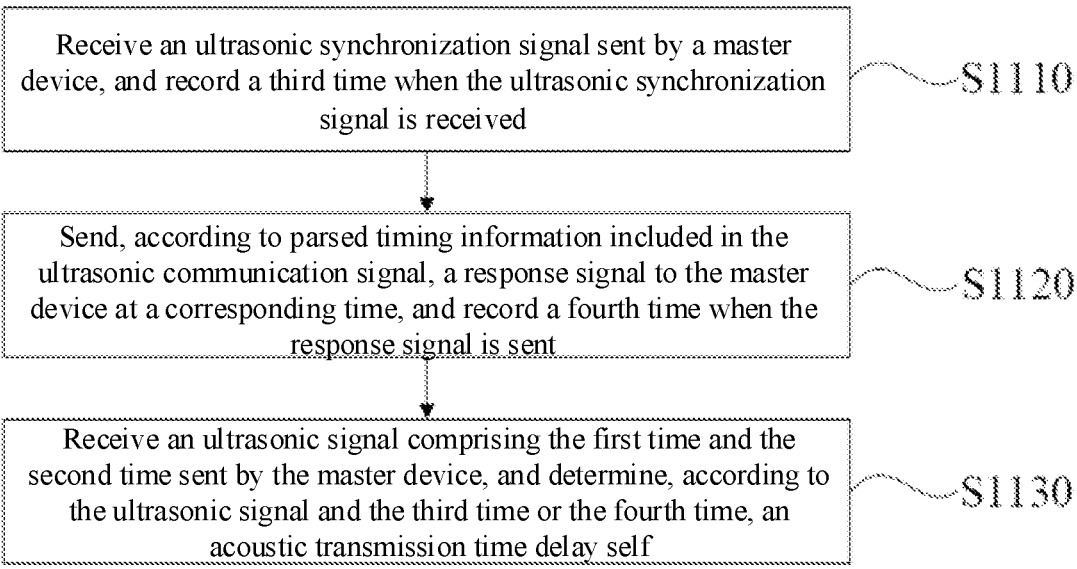

Receive an ultrasonic synchronization signal sent by a master device, and record a third time when the ultrasonic synchronization signal is received ~S1110

Send, according to parsed timing information included in the ultrasonic communication signal, a response signal to the master device at a corresponding time, and record a fourth time when the response signal is sent ~S1120

Receive an ultrasonic signal comprising the first time and the second time sent by the master device, and determine, according to the ultrasonic signal and the third time or the fourth time, an acoustic transmission time delay self ~S1130

FIG. 11

Receive detection timing, sent by a master device, of a controlled device in each detection cycle    ~S1210

Determine, according to the detection timing, a corresponding response time of the controlled device in each detection cycle, and send an ultrasonic sweep signal at the response time    ~S1220

1

COMMUNICATION METHOD, APPARATUS AND SYSTEM, AND STORAGE MEDIUM

CROSS-REFERENCE TO RELATED APPLICATIONS

The present application claims the benefit of priority to Chinese Application No. 202211167771.0, filed on Sep. 23, 2022, the contents of which are incorporated herein by reference in their entirety for all purposes.

BACKGROUND

With the development of the Artificial Intelligence & Internet of Things (AIoT) technology, intelligent home devices are becoming more and more popular; and a user may independently operate and control various intelligent devices in a home through a smart phone.

SUMMARY

The present disclosure relates to the technical field of communications of electronic devices, and in particular to a communication method, apparatus, system, and a storage medium.

According to a first aspect of the examples of the present disclosure, a communication method is provided. The communication method is applied to a master device and includes:

determining, according to the number of controlled devices and a preset time slot length, detection cycles and detection timing of various controlled devices in each detection cycle, the controlled devices and the master device are devices located in a same local area network;

receiving, in each time slot in the detection cycle, an ultrasonic sweep signal sent by the controlled device; and determining, according to the detection timing and the ultrasonic sweep signal, a detection result of the master device and the controlled device.

According to a second aspect of the examples of present disclosure, a communication method is provided. The method communication is applied to a controlled device and includes:

receiving detection timing, sent by the master device, of the controlled device in each detection cycle; and determining, according to the detection timing, a corresponding response time of the controlled device in each detection cycle, and sending an ultrasonic sweep signal at the response time.

According to a third aspect of the examples of the present disclosure, a communication system is provided, including:

a master device, including at least one acoustic emitter and at least two acoustic receivers, the at least two acoustic receivers being disposed at different positions of the master device; and at least one controlled device, each including at least one acoustic emitter and at least one acoustic receiver, the master device and the at least one controlled device being in a same local area network, where the master device includes a first controller, the first controller includes a first memory and a first processor, the first memory stores computer instructions, and the computer instructions are executed by the first processor, the first processor is caused to: determine, according to the number of controlled devices and a preset time slot length, detection cycles and detection timing of various controlled devices in a detection cycle, the controlled devices and the master device are devices located in a same local area network; receive, in a time slot in the detection cycle, an ultrasonic sweep signal sent by the controlled device; and determine, according to the detection timing and the ultrasonic sweep signal, a detection result of the master device and the controlled device; and each controlled device includes a second controller, the second controller includes a second memory and a second processor, the second memory stores computer instructions, and the computer instructions are executed by the second processor, the second processor is caused to: receive detection timing, sent by a master device, of the controlled device in each detection cycle; and determine, according to the detection timing, a corresponding response time of the controlled device in each detection cycle, and sending an ultrasonic sweep signal at the response time.

According to a fourth aspect of the examples of the present disclosure, a non-transitory computer-readable storage medium is provided, storing computer instructions, the computer instructions are used for enabling a computer to execute the method according to any one of the implements in the first aspect or the second aspect.

BRIEF DESCRIPTION OF THE DRAWINGS

The accompanying drawings herein are incorporated into the specification and constitute a part of the specification, show examples consistent with the present disclosure, and are used to explain the principle of the present disclosure together with the specification.

FIG. 3 is a flowchart of a communication method according to some embodiments of the present disclosure;

FIG. 6 is a flowchart of a communication method according to some embodiments of the present disclosure;

FIG. 7 is a principle diagram of a communication method according to some embodiments of the present disclosure;

FIG. 10 is a flowchart of a communication method according to some embodiments of the present disclosure;

FIG. 11 is a flowchart of a communication method according to some embodiments of the present disclosure;

DETAILED DESCRIPTION

Figure 1:
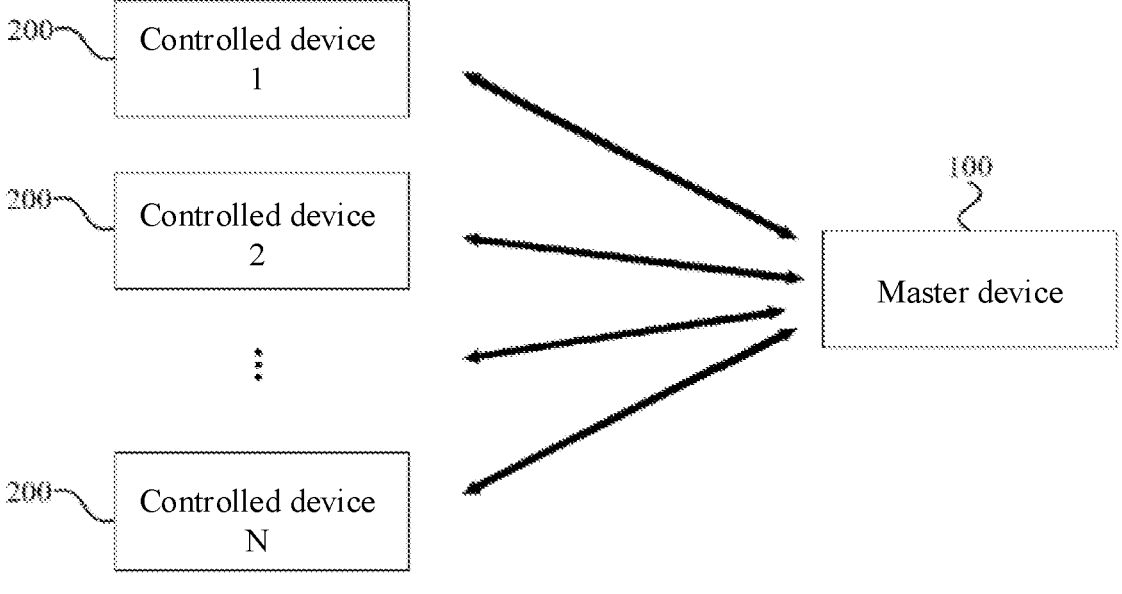
FIG. 1 is a schematic structural diagram of a communication system according to some embodiments of the present disclosure.

The technical solutions of the present disclosure will be clearly and completely described below with reference to the accompanying drawings. Apparently, the implements described are some of the implements of the present disclosure, not all of them. All other implements obtained by those of ordinary skill in the art based on the implements of the present disclosure without any creative efforts fall within the protection scope of the present disclosure. Moreover, the technical features mentioned in different implements of the present disclosure described below, can be combined with each other as long as they do not conflict with each other.

With the development of the Artificial Intelligence & Internet of Things (AIoT) technology, intelligent home devices are becoming more and more popular; and a user may independently operate and control various intelligent devices in a home through a smart phone.

At present, control on most of intelligent devices needs for turning on corresponding applications (APPs) on a mobile phone of a user, and relative control is achieved on an APP interface. For example, in an example scenario, if the user wants to turn on an intelligent audio in a home, the user starts a corresponding APP on the mobile phone, selects an option card of the intelligent audio in the APP interface, and then enters a control panel of the intelligent audio for selecting a corresponding switch for turning on the intelligent audio, turning on the intelligent audio.

In the related art, a mobile terminal is relatively tedious in control operation on intelligent home devices, resulting in relatively poor user experience.

It can be seen that in the above example, the control operation process for the intelligent device is tedious and complex. In order to simplify operations of the user, some mobile phones may be connected with the intelligent devices through "one finger", so as to achieve rapid start and control of operation interfaces.

It should be understood that one-finger connection refers to that, in response to the user holding the mobile phone to point to a certain intelligent device, a control option of the intelligent device may automatically pop up on a display interface of the mobile phone, so that rapid control operation of the intelligent device may be achieved without clicking control on the APP by the user.

In the related art, the one-finger connection technology is achieved by an ultra-wideband (UWB) technology, having the basic principle that: the mobile phone and the intelligent device end are both provided with the UWB modules; a distance and an angle are measured by using communication between the UWB modules at the two ends; a relative position relationship between the mobile phone and the intelligent device is determined in combination with a corresponding judgment logic, so that the effect that a control interface of a certain device may pop up once the mobile phone points to the device is fulfilled.

However, at present, most of the mobile phones and the intelligent devices do not have UWB related hardwares; and particularly for the launched intelligent devices without the UWB modules, the one-finger connection function cannot be fulfilled. Moreover, for the smart phones, additional addition of the UWB modules may increase both the difficulty in space stacking design and the cost of the mobile phones. Furthermore, in the related art, limited to an interior space of the mobile phone, the UWB module can be just provided on the side surface of a camera module, which results in that a UWB signal is hindered by the camera module, and finally, the precision and the accuracy of a detection result are relatively low.

Based on the above defects in the related art, in order to improve the control effect and precision between a master device and an intelligent device, the implements of the present disclosure provide a communication method, apparatus and system, and a storage medium and aim at achieving control on the master device and various controlled devices with the use of ultrasonic signals without adding a hardware structure, so that the cost is lowered; and moreover, more controlled devices may be simultaneously controlled, so as to improve the equipment capacity and the detection precision of the communication system.

FIG. 1 shows a schematic structural diagram of a communication system in some implements of the present disclosure. An application scenario of the implements of the present disclosure is described in combination with FIG. 1 below.

As shown in FIG. 1, the communication system of the examples of the present disclosure includes a master device 100 and at least one controlled device 200.

The master device 100 refers to an electronic device for sending a control instruction to various controlled devices 200, so as to control various controlled devices 200. In the implements of the present disclosure, the master device 100 is not limited in type and may be any type of devices suitable for implementation, such as a smartphone, a tablet computer, a handheld thermal and a desktop terminal, which will not be limited in the present disclosure.

The controlled device 200 refers to an electronic device which is located in a same near field communication network as the master device 100 and may receive and execute the control instruction from the master device 100. In the implements of the present disclosure, the controlled device 200 is not limited in type and may be any type of devices suitable for implementation, such as a smartphone, a tablet computer, a smart television, an intelligent audio, an intelligent fan, a floor mopping robot and an intelligent lamp, which will not be limited in the present disclosure.

In the implements of the present disclosure, the master device 100 and various controlled devices 200 are located in the same near field communication network. For example, with a home scenario as an example, the master device 100 and various controlled devices 200 may access a same home WiFi network; and the master device 100 may send or receive an instruction to or from various controlled devices 200 through a WiFi gateway.

In the implements of the present disclosure, a wireless communication connection may be established between the master device 100 and the controlled device 200 through an ultrasonic wave. For example, FIG. 2 shows a communication principle between a certain controlled device 200 and the master device 100.

Figure 2:
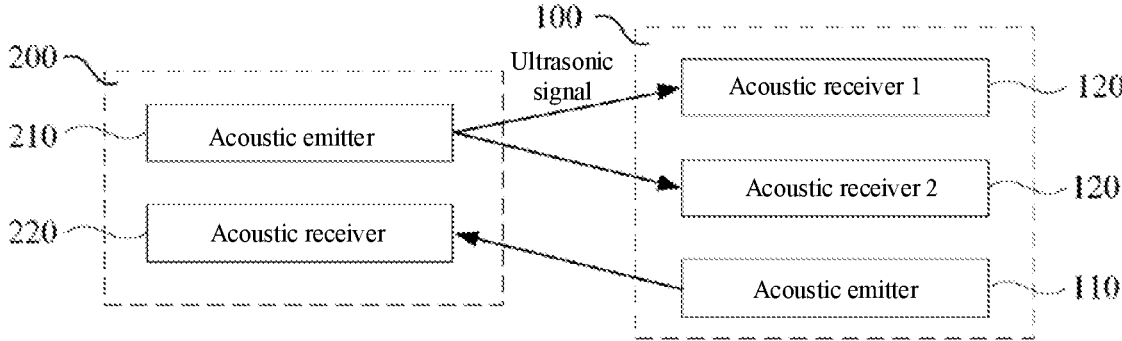
FIG. 2 is a schematic structural diagram of a communication system according to some embodiments of the present disclosure.

Referring to FIG. 2, at least one acoustic emitter 210 and an acoustic receiver 220 are disposed at the controlled device 200 end. It is to be understood that the acoustic emitter 210 refers to a sound generating unit which may generate the ultrasonic wave, such as a loudspeaker; and the acoustic receiver 220 refers to a hardware unit capable of receiving an acoustic signal, such as a microphone.

Moreover, some intelligent devices natively have the loudspeakers and the microphones, for example, the intelligent audio, the smart television and the like, so that the acoustic emitter 210 and the acoustic receiver 220 disclosed in the present disclosure may directly multiplex the loudspeaker and the microphone of the device without additionally adding hardware, and then the cost is lower; and the launched intelligent devices may also support the solution of the present disclosure and are more universal.

At least one acoustic emitter 110 (for example, the loudspeaker of the master device 100) is similarly disposed at the master device 100 end. Meanwhile, in the implements of the present disclosure, the relative positions of the master device 100 and the controlled device 200 are determined by comparing on at least two paths of signals. Therefore, the master device 100 further includes at least two acoustic receivers 120; and the acoustic receivers 120, for example, may be the microphones of the master device 100.

For example, in some implements, taking a mobile terminal such as the smartphone and the tablet computer as an example of the master device 100, the mobile terminal includes at least one loudspeaker; and the loudspeaker may serve as the acoustic emitter 110 of the master device 100. Moreover, the smartphone or the tablet computer at least includes two microphones with one disposed on the top of the device and the other disposed at the bottom of the device, so that the two microphones may serve as the two acoustic receivers 120 of the master device 100 respectively.

It can be seen from the above, in the implements of the present disclosure, the solution of the present disclosure may be achieved by multiplexing the existing loudspeakers and the microphones of the master device 100 and the controlled device 200 without additionally adding the hardware, lowering the cost of the device; and the solution of the present disclosure may further be achieved on the existing device, so that the communication system is more universal and is very suitable for application in a current AIoT scenario.

On the basis of the above communication system, the communication method of the implements of the present disclosure will be described below.

In some implements, the present disclosure provides a communication method. The communication method is applied to a master device, that is, is executed by the above master device 100, which will be described in combination with FIG. 3 below.

As shown in FIG. 3, in some implements, the communication method of the examples of the present disclosure includes:

S310, determining, according to the number of controlled devices and a preset time slot length, detection cycles and detection timing of various controlled devices in each detection cycle;

S320, receiving, in each time slot in the detection cycle, an ultrasonic sweep signal sent by each controlled device; and S330, determining, according to the detection timing and the ultrasonic sweep signal, a detection result of the master device and the controlled device.

It is to be understood that in a "one-finger connection" scenario, when the master device points to a certain controlled device, a control interface of the controlled device may pop up on the master device. Therefore, in the implements of the present disclosure, the more the controlled devices 200 included in the communication system, the better the achieved one-finger connection effect is.

For example, in an example scenario, 8 controlled devices 200 are included in a user home network in total. If the 8 controlled devices can access the communication system of the present disclosure at the same time, one-finger connection operation control on the 8 controlled devices at the same time may be achieved.

It is noteworthy that, in the implements of the present disclosure, an ultrasonic signal serves as a communication medium between the controlled device 200 and the master device 100. The ultrasonic wave refers to an acoustic wave with a frequency range of 20 KHz or above. However, in a conventional consumer electronic device, an ultrasonic frequency band generated by the loudspeaker of the device can just reach 24 KHz at most; that is to say, a total bandwidth for ultrasonic communication is just 4 KHz.

However, a bandwidth of an ultrasonic sweep signal for communicating the master device 100 with the controlled device 200 is 1 KHz at least. In order to achieve signal isolation between various controlled devices 200, a frequency band for communication between each controlled device 200 and the master device 100 occupies 1 KHz bandwidth at least.

In other words, for the total bandwidth of 4 KHz, in the absolutely ideal case, at most 4 Controlled devices 200 can access the communication system. Considering a guard interval between signals and the stability of the system, at most 3 Controlled devices 200 can access the communication system.

For example, in the above example scenario, if 8 controlled devices 200 are included in the user home scenario in total, a user can just select 3 controlled devices 200 to access the communication system, so as to achieve the one-finger connection function; while the other 5 Controlled devices 200 cannot achieve the one-finger connection function.

Therefore, in the implements of the present disclosure, on the basis of use of ultrasonic communication, communication between the master device and various controlled devices is achieved by using a time division mode rather than a frequency division mode, so that more controlled devices may access the communication system, and the capacity of the system is increased.

The communication method of the implements of the present disclosure includes: determining, according to the number of controlled devices and a preset time slot length, detection cycles and detection timing of various controlled devices in each detection cycle; receiving, in each time slot in the detection cycle, an ultrasonic sweep signal sent by each controlled device; and determining, according to the detection timing and the ultrasonic sweep signal, a detection result of the master device and the controlled device. The implements of the present disclosure achieve communication between the master device and the controlled devices by using an ultrasonic signal with just multiplexing an existing hardware structure of a device and without additionally providing an ultra-wideband (UWB) module, lowering the cost, improving the detection precision and resulting in stronger universality. In addition, each detection cycle is divided into a plurality of time slots; the master device may be communicate with one controlled device in each time slot; and communication isolation between a plurality of controlled devices is achieved by using a time division mode, so that the communication method is not limited by an acoustic communication bandwidth, may achieve communication connection with more controlled devices, and increases a capacity of a communication system.

It is to be understood that, in the implements of the present disclosure, the master device may determine, according to the number of the controlled devices and the preset time slot length, time lengths of the detection cycles and detection timing of various controlled devices in each detection cycle.

For example, in some implements, the master device 100 and various controlled devices 200 are located in the same local area network, so that the master device 100 may obtain various controlled devices 200 included in the current local area network and identification information (such as a device name and an IP address) of each controlled device 200 through the local area network.

For example, in one home scenario, 4 controlled devices 200 (which are an intelligent audio, a smart television, a floor mopping robot and an intelligent door lock respectively) access a home WiFi local area network in total, so that once accessing the WiFi local area network, the master device 100 may detect the 4 controlled devices 200 through the local area network and may obtain e the identification information (such as the device names and the IP addresses) of the 4 controlled devices 200 through the local area network.

A preset time slot length refers to a communication duration between each controlled device 200 and the master device 100 in one detection cycle; and the detection cycle may be understood as one cycle duration of the master device 100 alternately communicating with various controlled devices 200.

For example, still taking the home scenario as an example, 4 controlled devices 200 are included in the local area network in total, so that in one detection cycle, the master device 100 sequentially communicate with various controlled devices 200. Thus, one detection cycle may be divided into 4 time slots. For example, a duration of each detection cycle is T, and then a corresponding time slot length of each controlled device 200 is T/4.

Figure 4:
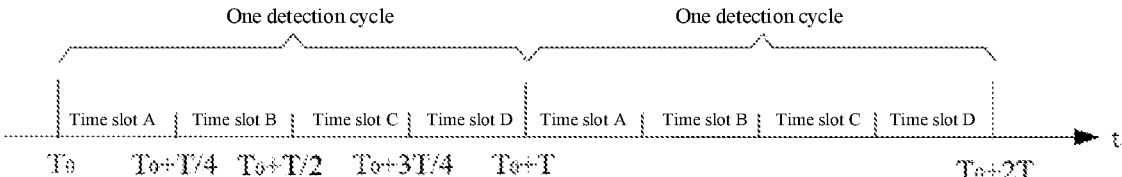
FIG. 4 is a principle diagram of a communication method according to some embodiments of the present disclosure.

Referring to FIG. 4, with an abscissa axis as time axis T, a start time of one detection cycle as T0 time and an end time as T0+T time, the duration of the detection cycle is T. In the detection cycle, 4 time slots are included in total, and a time length of each time slot is T/4, so that the 4 time slots are a time slot A [T0, T0+T/4], a time slot B [T0+T/4, T0+T/2], a time slot C [T0+T/2, T0+3T/4] and a time slot D [T0+3T/4, T0+T] respectively.

In a time slot A phase, the master device 100 may communicate with a controlled device A; in a time slot B phase, the master device 100 may communicate with a controlled device B; in a time slot C phase, the master device 100 may communicate with a controlled device C; and in a time slot D phase, the master device 100 may communicate with a controlled device D.

It can be seen that, in one detection cycle, the master device 100 may communicate with the corresponding controlled device 200 in each time slot phase, so as to sequentially communicate with all the controlled devices 200 in one detection cycle. After entering a next detection cycle, the master device 100 communicates with the controlled devices A-D in the above order again, so as to still finish communicating with all the controlled devices 200 in the next detection cycle.

From the above, in the implements of the present disclosure, the communication method is not limited to the ultrasonic communication bandwidth due to no need for division on a communication bandwidth; moreover, through time division, in the case that a system sampling frequency meets the demands, time-sharing communication of more controlled devices 200 may be achieved in one detection cycle, which is not limited to 4 Controlled devices 200 in the above example and will be described in the present disclosure below.

It is to be understood that, in the implements of the present disclosure, in order to achieve time-sharing communication of all the controlled devices 200, the duration of the detection cycle, the number of the time slots divided in the detection cycle and an order of the corresponding controlled devices 200 of various time slots are determined first.

It can be seen that, in combination with FIG. 4, a time length of one detection cycle is larger than or equal to a product of each time slot length and the number of the controlled devices. From the foregoing, the master device 100 may obtain the number of the controlled devices 200 through the local area network; while each time slot length may be reasonably set according to an application scenario.

It is noteworthy that, in the implements of the present disclosure, although a value of the preset time slot length is not limited, it would be understood by those skilled in the art that if the value of the preset time slot length of each time slot is too small, the master device cannot completely receive the ultrasonic sweep signal of the controlled device in this time slot phase, resulting in a failure in detection. On the contrary, if the value of the preset time slot length of each time slot is too large, the time of the whole detection cycle would be prolonged, and a detection frequency of each controlled device is lowered, resulting in poor detection efficiency.

Therefore, the present disclosure makes guidance description for a determination process of the value of the preset time slot length in combination with the foregoing home scenario example below.

At present, the conventional consumer electronic product has a sampling frequency for acoustic wave transceiving of 48 KHz to the maximum, that is, can at most samples 48000 sampling points each second.

A length of the ultrasonic sweep signal meeting communication between the master device 100 and the controlled device 200 is 1024 sampling points at least. Meanwhile, in order to ensure no collision between signals of different controlled devices 200, according to prior knowledge, a guard interval of 3000 sampling points is reserved after the ultrasonic sweep signal of each controlled device 200 is sent; and further considering a signal arrival offset generated by a displacement of the device, a redundancy of at least 2000 sampling points further is set. Therefore, a corresponding signal length of the ultrasonic signal of each controlled device 200 is 1024+3000+2000=6024 sampling points, which, for convenience in calculation, is rounded up to obtain 6000 sampling points.

From the foregoing, a sampling frequency of an acoustic system of the controlled device 200 is 48 KHz, so that a time length by the ultrasonic sweep signal of each controlled device 200 is 6000/48000=0.125 s, i.e., 125 ms, and then the preset time slot length may be determined as 125 ms.

It would be understood by those skilled in the art that the above example is the example of the implements of the present disclosure. In other implements, the preset time slot length may take other values, for example, 100 ms, 150 ms and the like, which is not limited to the present disclosure.

After the preset time slot length and the number of the controlled devices 200 are determined, a minimum time length of each detection cycle may be calculated by multiplying the preset time slot length by the number of the controlled devices. For example, the preset time slot length is 125 ms, and 8 Controlled devices 200 are included in the communication system in total, so that a time length of one detection cycle is T=125 ms*8=1 s, that is, the 8 controlled devices may be detected each second.

It would be understood by those skilled in the art that the time length of the detection cycle is at least equal to or larger than a product of the number of the controlled devices 200 and the preset time slot length, which is not limited to the present disclosure. However, it is to be understood that the detection cycle with a long time length may cause a certain time redundancy. Therefore, it is optimal that the product of the number of the controlled devices 200 and the preset time slot length serves as the time length of the detection cycle, which is not described in detail again in the present disclosure.

It can be seen, in the implements of the present disclosure, although the signal interval between various controlled device 200 and the stability of the system are fully considered, detection on the 8 controlled devices each second may be satisfied at least; that is, the 8 controlled devices may access the communication system at the same time, so as to achieve the one-finger connection function of the 8 controlled devices. Moreover, when the preset time slot length is set as 100 ms, the communication system may detect 10 controlled devices at the same time each second. Compared with the frequency band division mode, the solution of the implements of the present disclosure greatly increases the number of the controlled devices and increase the capacity of the communication system.

For convenience in description, the following still takes 4 Controlled devices 200 shown in FIG. 4 as an example. In the example of the FIG. 4, the preset time slot length is 125 ms, and 4 Controlled devices 200 are included in the communication system in total, so that a time length of each detection cycle is T=125 ms*4=0.5 s.

After the length of the detection cycle is determined, a communication order (i.e., detection timing disclosed in the present disclosure) of each controlled device is further determined. For example, in a detection cycle shown in FIG. 4, each time slot corresponds to a communication phase of one controlled device 200, so that in timing, communication orders of various controlled devices 200 are sequenced.

In some implements, when the master device 100 may detect various controlled devices 200 through the local area network, the controlled devices are sequenced, so that communication sequences of various controlled devices are obtained and then sequentially allocated to various time slots.

For example in FIG. 4, the time slot A may correspond to the communication phase of the controlled device A; the time slot B may correspond to the communication phase of the controlled device B; the time slot C may correspond to the communication phase of the controlled device C; and the time slot D may correspond to the communication phase of the controlled device D. The above may be understood by those skilled in the art and details are not described again in the present disclosure.

It is noteworthy that, except including the corresponding communication sequences of the above controlled devices, the detection timing of the controlled devices in the implements of the present disclosure further includes communication times for various controlled devices, which may be understood as times of the controlled devices sending the ultrasonic sweep signals.

It is to be understood that, for example, in FIG. 4, in order to enable the master device 100 to receive the ultrasonic sweep signal sent by the controlled device A in the time slot A phase, the controlled device A strictly sends the sweep signal according to a specified time. Therefore, the master device 100 may send the detection timing to various controlled devices 200 in advance, so that the controlled devices 200 may send the ultrasonic sweep signals according to the specified time in the detection timing, so as to ensure that the master device 100 may receive the ultrasonic sweep signals in the corresponding time slots.

In some implements, considering an acoustic signal transmission time delay between the master device and the controlled device as well as a delay between sending the instruction by the device and sending the acoustic wave by an acoustic emitter, the master device and the controlled device in the communication system may be synchronized in advance, so that the effect of the time delay is weakened and the communication precision is further ensured. The implements are described in the present disclosure in the following and are not described in detail here.

In the implements of the present disclosure, the master device 100, in each time slot in each detection cycle, may receive the ultrasonic sweep signal sent by the corresponding controlled devices 200 of the time slot. The sweep signal refers to that the signal is repeatedly scanned within a certain range over time according to a sinusoid frequency, the sweep signal has very good autocorrelation. Therefore, in the implements of the present disclosure, each controlled device 200 may send the ultrasonic sweep signal to the master device 100.

Once receiving the ultrasonic sweep signal, the master device 100 may perform corresponding processing according to the ultrasonic sweep signal, and then the corresponding detection result is determined.

For example, in the foregoing one-finger connection scenario, after the master device 100 receives the ultrasonic sweep signal sent by the corresponding controlled device in a certain time slot, the detection result obtained according to the ultrasonic sweep signal represents whether the current master device 100 points to the controlled device.

In some implements, as shown in combination with FIG. 2, the master device 100 end includes at least two acoustic receivers 120, so that when the controlled device 200 sends the ultrasonic sweep signal, the two acoustic receivers 120 of the master device 100 may both receive the ultrasonic sweep signal. Then, the master device 100 may determine, according to a time difference between the two acoustic receivers 120 receiving the ultrasonic sweep signal, whether the current master device 100 points to the controlled device.

For example, as shown in FIG. 4, when the master device 100 is in the time slot A phase, the acoustic receiver 1 and the acoustic receiver 2 may both receive the ultrasonic sweep signal sent by the controlled device A; and the master device 100 may determine, according to a time difference between the two acoustic receivers receiving the ultrasonic sweep signal, whether the current master device 100 points to the controlled device A. Similarly, after entering the time slot B phase, the acoustic receiver 1 and the acoustic receiver 2 of the master device 100 may both receive the ultrasonic sweep signal sent by the controlled device B; and the master device 100 may determine, according to a time difference between the two acoustic receivers receiving the ultrasonic sweep signal, whether the current master device 100 points to the controlled device B. Similarly, in one detection cycle, the master device 100 may detect all the controlled devices 200 to obtain the corresponding detection result.

The process that the master device 100 determines, according to the ultrasonic sweep signal, the detection result is described below in the implements of present disclosure and is not described in detail here.

From the above, in the implements of the present disclosure, communication between the master device and the controlled device is achieved by using the ultrasonic signal with just multiplexing an existing hardware structure of a device and without additionally providing an ultra-wideband (UWB) module, lowering the cost, improving the detection precision and resulting in stronger universality. In addition, communication isolation between a plurality of controlled devices is achieved by employing a time division mode, so that the communication method is not limited by an acoustic communication bandwidth, may achieve communication connection between more controlled devices, and increases a capacity of a communication system.

Figure 5:
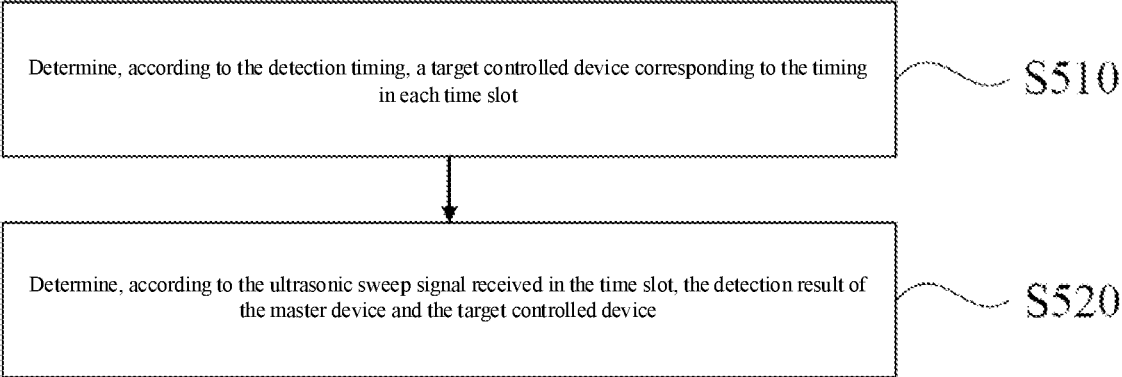
FIG. 5 is a flowchart of a communication method according to some embodiments of the present disclosure.

As shown in FIG. 5, in some implements, in the communication method of the present disclosure, the process that the master device determines, according to the received ultrasonic sweep signal, the detection result includes:

S510, determining, according to the detection timing, a target controlled device corresponding to the timing in each time slot; and S520, determining, according to the ultrasonic sweep signal received in the time slot, the detection result of the master device and the target controlled device.

Based on the foregoing, in an arbitrary one-time slot in the detection cycle, the master device 100 may determine, according to the detection timing, which is the corresponding controlled device 200 corresponding to the time slot; and the controlled device 200 corresponding to the time slot is the target controlled device disclosed in the present disclosure.

For example, in FIG. 4, the master device 100 receives the ultrasonic sweep signal in the time slot A and may determine, according to the detection timing, that the controlled device corresponding to the time slot A is the controlled device A, so as to determine that the controlled device A is determined as the target controlled device.

Once the target controlled device is determined, the detection result of the master device 100 and the target controlled device (i.e., the controlled device A) may be determined according to the received ultrasonic sweep signal, which is described below in combination with implements in FIG. 6.

As shown in FIG. 6, in some implements, in the communication method of the present disclosure, the process that the master device determines, according to the received ultrasonic sweep signal, the detection result includes:

S610, obtaining a first ultrasonic sweep signal received by a first microphone of the master device and a second ultrasonic sweep signal received by a second microphone of the master device.

It can be known with reference to the foregoing, the master device 100 includes two acoustic receivers 120. In some implements of the present disclosure, the two acoustic receivers 120 are the first microphone and the second microphone respectively.

In the implements of the present disclosure, taking arbitrary one time slot in the detection cycle as an example, in this time slot phase, the target controlled device 200 may send the ultrasonic sweep signal to the master device 100, so that the first microphone and the second microphone of the master device 100 may both receive the ultrasonic sweep signals, i.e., the first ultrasonic sweep signal and the second ultrasonic sweep signal disclosed in the present disclosure.

S620, determining, according to the first ultrasonic sweep signal and the second ultrasonic sweep signal, a time difference between the first microphone and the second microphone receiving the ultrasonic sweep signals.

In the implements of the present disclosure, the first microphone and the second microphone of the master device 100 are disposed at different positions, so that in the case of different relative positions between the master device 100 and the target controlled device 200, the time when the first microphone receives the first ultrasonic sweep signal may be identical to or different from the time when the second microphone receives the second ultrasonic sweep signal.

For example, as shown in FIG. 7, the master device 100 takes the smartphone as an example. The smartphone is generally provided with a first microphone M on the top and a second microphone N at the bottom; a midpoint of a connecting line between the first microphone M and the second microphone N is O; and the position of the acoustic emitter 210 of the target controlled device 200 is point P.

Referring to (a) in FIG. 7, in this scenario, a connecting line PO between the acoustic source position P of the target controlled device 200 and the point O is perpendicular to the connecting line MN between the two microphones, that is, PO⊥MN; and in this scenario, it may be defined that the master device 100 points to the target controlled device 200.

Referring to (b) in FIG. 7, in this scenario, the connecting line PO between the acoustic source position P of the target controlled device 200 and the point O is not perpendicular to the connecting line MN between the two microphones, that is, an included angle (not equal to 90°) is provided between PO and MN; and in this scenario, it may be defined that the master device 100 does not point to the target controlled device 200.

Through comparison on (a) and (b) in FIG. 7, in the case that the master device 100 points to the target controlled device 200, a distance PM between the acoustic source P and the first microphone M is identical to a distance PN between the acoustic source P and the second microphone N; and otherwise, PM is different from PN.

Therefore, in the implements of the present disclosure, detecting whether the master device 100 points to the target controlled device 200 may be defined as: whether the times when the two microphones of the master device 100 receive the ultrasonic sweep signal sent by the target controlled device 200 are the same.

Based on this, in the implements of the present disclosure, once the first ultrasonic sweep signal is received by the first microphone, and the second ultrasonic sweep signal is received by the second microphone, the master device 100 may calculate a time difference between the above two.

In some implements, correlation peak processing may be performed on the first ultrasonic sweep signal and the second ultrasonic sweep signal by using a correlation peak processing mode, and a time difference between the above two is obtained.

For example, in some implements, after obtaining the first ultrasonic sweep signal and the second ultrasonic sweep signal, the master device 100 may obtain a first frequency domain signal by converting the first ultrasonic sweep signal from a time domain to a frequency domain and obtain a second frequency domain signal by converting the second ultrasonic sweep signal from a time domain to a frequency domain. Then, a frequency domain related signal is obtained by multiplying the first frequency domain signal by the second frequency domain signal. Then, a time domain related signal is obtained by converting the frequency domain related signal from the frequency domain to the time domain; and then, according to a peak in the time domain related signal, a time difference between the first microphone receiving the first ultrasonic sweep signal and the second microphone receiving the second ultrasonic sweep signal may be obtained by correlation peak processing.

The above may be understood and fully implemented by those skilled in the art with reference to a correlation peak algorithm in the related art, and details are not described again in the present disclosure.

S630, determining, according to the time difference, the detection result of the master device and the target controlled device.

It can be known in combination with the foregoing, in the case that the master device 100 points to the target controlled device 200, the times when the two microphones of the master device 100 receive the ultrasonic sweep signal sent by the target controlled device 200 substantially keep consistent.

Therefore, in the implements of the present disclosure, a corresponding preset threshold may be set according to the needs of the scenario. The preset threshold represents a boundary value for the time when the first microphone receives the first ultrasonic sweep signal being identical to the time when the second microphone receives the second ultrasonic sweep signal.

Therefore, in some implements, if the time difference is smaller than the preset threshold, it is represented that the time when the first microphone receives the first ultrasonic sweep signal is identical to the time when the second microphone receives the second ultrasonic sweep signal; that is to say, the master device 100 currently points to the target controlled device. On the contrary, if the time difference is no less than the preset threshold, it is represented that the time when the first microphone receives the first ultrasonic sweep signal is different from the time when the second microphone receives the second ultrasonic sweep signal; that is to say, the master device 100 does not point to the target controlled device currently.

In the above implement, with one time slot in the detection cycle as an example, the detection process of the target controlled device is described. In a next time slot phase, the master device 100 may obtain a detection result in the next time slot phase just by executing the above process repeatedly according to the received ultrasonic sweep signal. Similarly, the master device 100 may detect all the controlled devices in each detection cycle, which is not described in detail again in the present disclosure.

In some implements, in a certain time slot phase, if the master device 100 detects that it currently points to the corresponding controlled device 200, a control option card of the controlled device 200 may be output and displayed on a display interface of the master device 100, the control option card includes a control option of the controlled device 200.

For example, in a certain time slot phase, if the master device 100 detects that the currently pointed controlled device 200 is an intelligent fan, control options (for example, including a switch option, a rotating speed control option and a wind direction control option) of the intelligent fan may automatically pop up on the display interface of the master device 100.

However, in some other implements, in a certain time slot phase, if the master device 100 detects that it does not point to the corresponding controlled device 200 currently, in response to the display interface of the master device 100 not displaying the control option card of the controlled device 200, no action is executed, and a next controlled device 200 is just continuously detected in a next time slot. On the contrary, in response to the display interface of the master device 100 currently displaying the control option card of the controlled device 200, display of the control option card may be canceled.

From the above, in the implements of the present disclosure, communication between the master device and the controlled device is achieved by using the ultrasonic signal with just multiplexing an existing hardware structure of a device and without additionally providing an ultra-wideband (UWB) module, lowering the cost, improving the detection precision and resulting in stronger universality. In addition, communication isolation between a plurality of controlled devices is achieved by employing a time division mode, so that the communication method is not limited by an acoustic communication bandwidth, may achieve communication connection between more controlled devices, and increases a capacity of a communication system. And, the detection result is determined based on the time difference between the ultrasonic sweep signal arriving at the two microphones of the master device, which is simple in control logic and high in detection efficiency.

It is noteworthy that, in the implements of the present disclosure, the master device 100 receives the ultrasonic sweep signal sent by the corresponding controlled device 200 in each time slot phase, and thus the controlled device 200 sends the ultrasonic sweep signal according to the specified time strictly. In order to ensure the master device 100 to keep synchronous with the controlled device 200, before detecting various controlled devices 200, the communication system synchronizes the master device 100 and various controlled devices 200 in an acoustic communication thread, which is described below.

Figure 8:
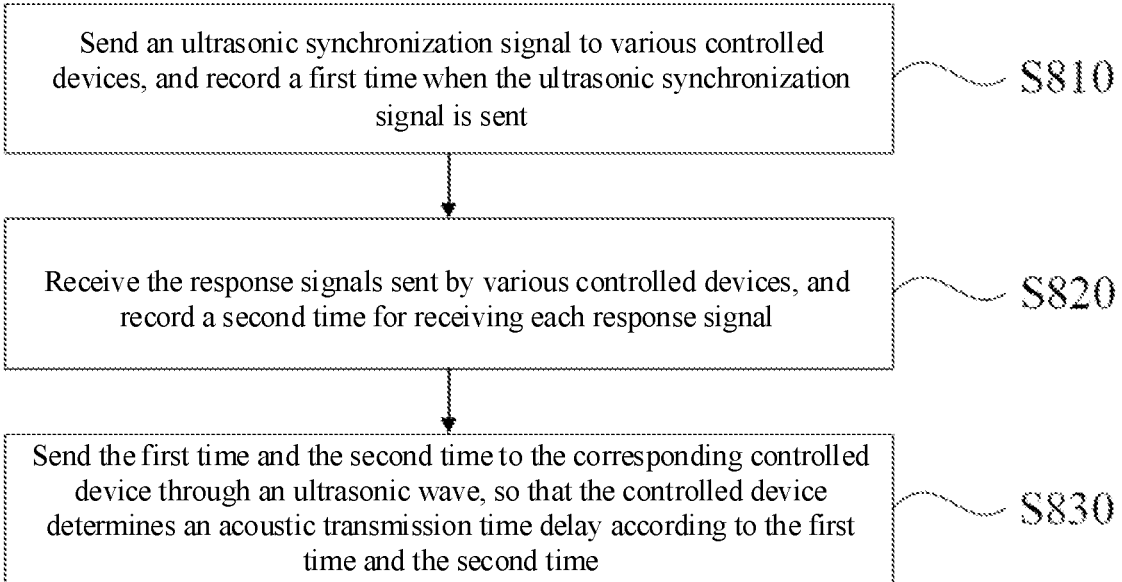
FIG. 8 is a flowchart of a communication method according to some embodiments of the present disclosure.

As shown in FIG. 8, in some implements, in the communication method of the examples of the present disclosure, the process that the communication system performs synchronization in acoustic communication thread includes:

S810, sending an ultrasonic synchronization signal to various controlled devices, and recording a first time when the ultrasonic synchronization signal is sent.

In the implements of the present disclosure, at the beginning of a synchronization phase, the master device 100 sends the ultrasonic synchronization signal to all the controlled devices 200, so as to initiate synchronization, where the ultrasonic synchronization signal includes timing information of each controlled device 200 returning a response signal.

It is to be understood that after receiving the ultrasonic synchronization signal, the controlled device 200 notifies, according to the returned response signal, the master device 100 of a correct response self. However, due to a huge number of the controlled devices 200 in the local area network and different distances of the controlled device 200 from the master device 100, timing of various controlled devices 200 returning the response signals is specified, so that the master device 100 sequentially receives, according to the order specified by the timing information, the response signal of each controlled device 200.

In some implements, as the master device 100 sends the ultrasonic synchronization signal to all the controlled devices 200, in order to weaken communication interference between the master device 100 and various controlled devices 200, the master device 100 may modulate the above ultrasonic synchronization signal to an orthogonal frequency division multiplexing (OFDM) signal and send the OFDM signal. The OFDM signal may well eliminate signal interference caused by a plurality of paths, and then the signal transmission quality is improved. After the controlled device 200 receives the OFDM signal, the corresponding timing information may be obtained by demodulating the OFDM signal.

Figure 9:
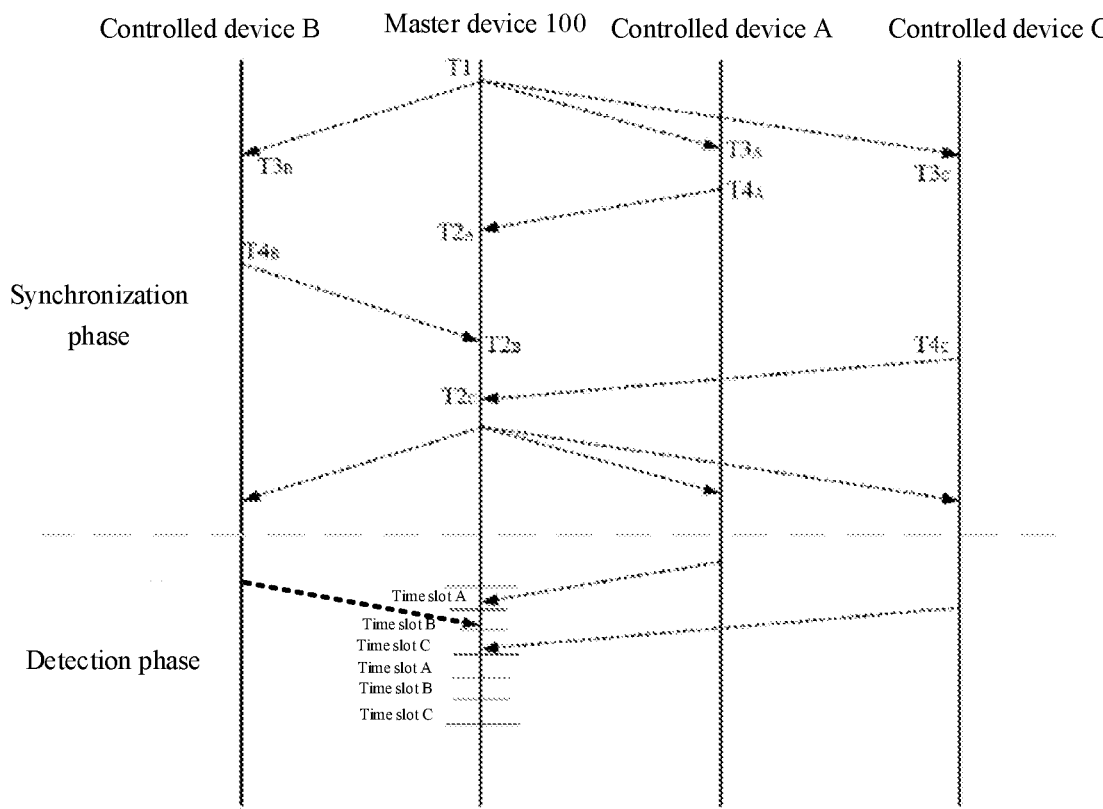
FIG. 9 is a principle diagram of a communication method according to some embodiments of the present disclosure.

FIG. 9 shows a diagram of communication principle in an example scenario of the present disclosure. As shown in FIG. 9, in this example, 3 controlled devices are included in the communication system in total and are a controlled device A, a controlled device B and a controlled device C respectively.

In the synchronization phase, the master device 100 sends the ultrasonic synchronization signal to all the controlled devices, and each controlled device may receive the ultrasonic synchronization signal at a certain time. In this way, the master device records a first time T1 for sending the ultrasonic synchronization signal at the master device end; and the controlled device records a third time $T3_N$ (a subscript N represents a reference numeral of the controlled device, for example, the third time when the controlled device A receives the ultrasonic synchronization signal is represented as $T3_A$) for receiving the ultrasonic synchronization signal at each controlled device end.

S820, receiving the response signals sent by various controlled devices, and recording a second time for receiving each response signal.

From the foregoing, after receiving the ultrasonic synchronization signal sent by the master device 100, the controlled device 200 end returns the response signal according to the timing information carried by the ultrasonic synchronization signal, the response signal is an ultrasonic signal generated, according to the timing information of the ultrasonic synchronization signal, by the controlled device.

For example, in FIG. 9, the timing information included in the ultrasonic synchronization signal represents that: the controlled device A sends the response signal at a first time interval after receiving the ultrasonic synchronization signal; the controlled device B sends the response signal at a second time interval after receiving the ultrasonic synchronization signal; and the controlled device C sends the response signal at a third time interval after receiving the ultrasonic synchronization signal, the first time interval, the second time interval and the third time interval are sequentially increased.

In this way, for various controlled device ends, the controlled device A returns the response signal first and records a fourth time $T4_A$ for returning the response signal; and the master device 100 end receives the response signal returned by the controlled device A first and records a second time $T2_A$ for receiving the response signal. Then, the controlled device B returns the response signal second and records a fourth time $T4_B$ for returning the response signal; and the master device 100 end receives the response signal returned by the controlled device B second and records a second time $T2_B$ for receiving the response signal. Further then, the controlled device C returns the response signal finally and records a fourth time $T4_C$ for returning the response signal; and the master device 100 end receives the response signal returned by the controlled device C finally and records a second time $T2_C$ for receiving the response signal.

S830, sending the first time and the second time to the corresponding controlled device through an ultrasonic wave, so that the controlled device determines an acoustic transmission time delay according to the first time and the second time.

After sequentially receiving the response signals returned by various controlled devices, the master device 100 end sends the recorded first time T1 for sending the ultrasonic synchronization signal and second time $T2_N$ for receiving the response signal of each controlled device to the corresponding controlled device end.

For example, in FIG. 9, the master device sends the first time T1 and the second time $T2_A$ to the controlled device A, the first time T1 and the second time $T2_B$ to the controlled device B and the first time T1 and the second time $T2_C$ to the controlled device C.

In some implements, in order to weaken communication interference between the master device 100 and various controlled devices, the master device 100 may modulate information about the first time T1 and the second time $T2_N$ to an orthogonal frequency division multiplexing (OFDM) signal and send the OFDM signal. The OFDM signal may well eliminate signal interference caused by a plurality of paths, and then the signal transmission quality is improved. After the controlled device end receives the OFDM signal, corresponding information may be obtained by demodulating the OFDM signal.

After receiving the first time T1 and the second time $T2_N$, various controlled device ends may calculate acoustic transmission time delays between themselves and the master device 100 in combination with the recorded third time $T3_N$ and the fourth time $T4_N$ self.

The acoustic transmission time delay refers to a transmission time from sending an acoustic wave by an acoustic source to receiving a signal by a receiving device. In the implements of the present disclosure, the acoustic transmission time delay of the controlled device is a difference between the third time $T3_N$ and the first time T1 or a difference between the second time $T2_N$ and the fourth time $T4_N$. For example, in FIG. 9, the acoustic transmission time delay between the controlled device A and the master device is $(T3_A-T1)$ or $(T2_A-T4_A)$; the acoustic transmission time delay between the controlled device B and the master device is $(T3_B-T1)$ or $(T2_B-T4_B)$; and the acoustic transmission time delay between the controlled device C and the master device is $(T3_C-T1)$ or $(T2_C-T4_C)$.

After each controlled device calculates the acoustic transmission time delay between itself and the master device, in the detection phase, the controlled device may generate and send the ultrasonic sweep signal according to the detection timing specified by the master device and in combination with the transmission time delay, so that the master device end may receive the ultrasonic sweep signal of the controlled device in the corresponding time slot of the detection cycle. Detection is finished through the process in the foregoing method.

It is to be understood that after determining the acoustic transmission time delay between the controlled device end self and the master device, the controlled device end may determine, according to the acoustic transmission time delay, a response time for sending the ultrasonic sweep signal, and send the ultrasonic sweep signal at the response time, so that the master device end receives the ultrasonic sweep signal in the corresponding time slot.

For example, in FIG. 9, in the detection phase, each detection cycle includes 3 time slots. Taking the time slot A as an example, the master device 100 receives the ultrasonic sweep signal sent by the controlled device A in the time slot A. The controlled device A may obtain the acoustic transmission time delay between itself and the master device 100 in the synchronization phase. Therefore, the controlled device A may send, based on the acoustic transmission time delay, the ultrasonic sweep signal in advance, so that the time when the master device 100 receives the ultrasonic sweep signal falls within the time slot A, and then the effect on precision due to the acoustic transmission time delay is eliminated or weakened. The same applies to the controlled device B and the controlled device C, and details are not described again in the present disclosure.

From the above, in the implements of the present disclosure, by synchronizing the master device and various controlled devices in acoustic communication thread, the effect of a communication time delay between the master device and the controlled device is eliminated or weakened, the signal synchronization between the master device and the controlled device is ensured, and the communication precision is improved.

It is noteworthy that, in the above synchronization phase, the master device 100 sends the ultrasonic synchronization signal to various controlled devices 200. In order to ensure that the controlled device may correctly receive the ultrasonic synchronization signal, the ultrasonic synchronization signal carries corresponding identification information of the controlled device, for example, MAC addresses, device names, IP addresses or the like of the controlled devices, which is not limited to the present disclosure.

In some implements, considering limited communication bandwidth between the master device and each controlled device, in order to reduce the transmission data volume, the master device 100 may reallocate the addresses to all the controlled devices 200 in the local area network. The following is described in combination with the implement in FIG. 10.

As shown in FIG. 10, in some implement, the communication method of the examples of the present disclosure further includes:

S1010, obtaining first identification information of various controlled devices in a same local area network as the master device; and S1020, allocating, according to the first identification information, second identification information to each controlled device.

It is to be understood that the master device 100 and various controlled devices 200 are located in the same local area network, so that the master device 100 may obtain the identification information (i.e., the first identification information) of various controlled devices 200 through the local area network.

In the implements of the present disclosure, the first identification information may be any information capable of uniquely identifying the device, such as the MAC address, the IP address or the device name of the controlled device, which is not limited to the present disclosure.

For example, for a device accessing a same WiFi local area network, the local area network may allocate a unique IP address (for example, 10.220.100.100) to the device; and the IP address may serve as the first identification information of the controlled device 200.

It is to be understood that, if the master device 100 directly carries the IP address of each controlled device 200 in an acoustic signal, the transmission data volume is relatively large. Therefore, in the implements of the present disclosure, the second identification information may be allocated to various controlled devices according to the first identification information of various controlled devices; and the data volume of the second identification information is smaller than that of the first identification information.

For example, the controlled devices may be sequenced according to the timing information of various controlled devices; and sequence numbers serve as the second identification information of the corresponding controlled devices, that is the numbers of 1-n, A-Z or the like directly serve as the second identification information of the controlled devices and are allocated to various controlled devices respectively. It is to be understood that, the data volume of 1-bit or 2-bit of the second identification information is far smaller than that of the IP addresses. Therefore, by reallocating the second identification information according to the first identification information, the transmission data volume of the acoustic wave is reduced, and the transmission efficiency is improved.

From the above, in the implements of the present disclosure, communication between the master device and the controlled device is achieved by using the ultrasonic signal with just multiplexing an existing hardware structure of a device and without additionally providing an ultra-wideband (UWB) module, lowering the cost, improving the detection precision and resulting in stronger universality. In addition, communication isolation between a plurality of controlled devices is achieved by employing a time division mode, so that the communication method is not limited by an acoustic communication bandwidth, may achieve communication connection between more controlled devices, and increases a capacity of a communication system. And, the detection result is determined based on the time difference between the ultrasonic sweep signal arriving the two microphones of the master device, which is simple in control logic and high in detection efficiency. By synchronizing the master device and various controlled devices in acoustic communication thread, the effect of a communication time delay between the master device and the controlled device is eliminated or weakened, the signal synchronization between the master device and the controlled device is ensured, and the communication precision is improved. By reallocating the second identification information according to the first identification information, the transmission data volume of the acoustic wave is reduced, and the transmission efficiency is improved.

On the basis of the foregoing communication systems shown in FIG. 1 and FIG. 2, the implements of the present disclosure provide a communication method. The method may be applied to arbitrary foregoing controlled device 200 and is executed by the controlled device 200. The following is described in combination with the implement in FIG. 11.

As shown in FIG. 11, in some implements, the communication method of the examples of the present disclosure includes:

S1110, receiving an ultrasonic synchronization signal sent by a master device, and recording a third time when the ultrasonic synchronization signal is received;

S1120, sending, according to parsed timing information included in the ultrasonic synchronization signal, a response signal to the master device at a corresponding time, and recording a fourth time when the response signal is sent; and S1130, receiving an ultrasonic signal comprising the first time and the second time sent by the master device, and determining, according to the ultrasonic signal and the third time or the fourth time, an acoustic transmission time delay self.

In combination with the scenario as shown in FIG. 9, in the synchronization phase, the master device 100 sends the ultrasonic synchronization signal to all the controlled devices, and each controlled device may receive the ultrasonic synchronization signal at a certain time. The master device records a first time T1 for sending the ultrasonic synchronization signal at the master device end; and the controlled device records a third time $T3_N$ for receiving the ultrasonic synchronization signal at each controlled device end.

After receiving the ultrasonic synchronization signal sent by the master device 100, the controlled device 200 end may obtain the timing information carried by the ultrasonic synchronization signal by parsing the ultrasonic synchronization signal, then generates a response signal based on the timing information, returns the response signal to the master device and records the fourth time $T4_N$ for returning the response signal.

After sequentially receiving the response signals returned by various controlled devices, the master device 100 end sends the recorded first time T1 for sending the ultrasonic synchronization signal and second time $T2_N$ for receiving the response signal of each controlled device to the corresponding controlled device end. In this way, the controlled device may receive the first time T1 and the second time $T2_N$ sent by the master device.

After receiving the first time T1 and the second time $T2_N$, the controlled device end may calculate an acoustic transmission time delay between itself and the master device 100 in combination with the recorded third time $T3_N$ and the fourth time $T4_N$ self.

In the implements of the present disclosure, the part which is not described in detail may be understood and fully implemented by those skilled in the art undoubtedly with reference to the foregoing, and details are not described again in the present disclosure.

From the above, in the implements of the present disclosure, by synchronizing the master device and various controlled devices in acoustic communication thread, the effect of a communication time delay between the master device and the controlled device is eliminated or weakened, the signal synchronization between the master device and the controlled device is ensured, and the communication precision is improved.

Figure 12:
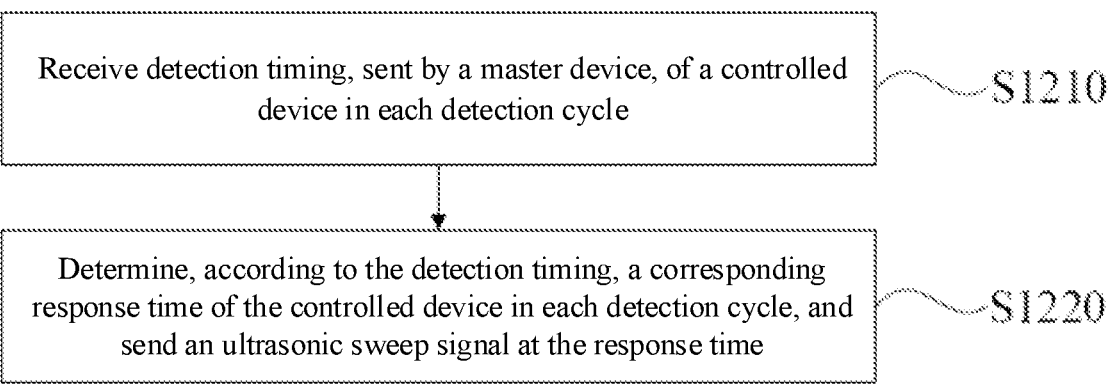
FIG. 12 is a flowchart of a communication method according to some embodiments of the present disclosure.

As shown in FIG. 12, in some implements, the communication method of the examples of the present disclosure includes:

S1210, receiving detection timing, sent by a master device, of a controlled device in each detection cycle; and S1220, determining, according to the detection timing, a corresponding response time of the controlled device in each detection cycle, and sending an ultrasonic sweep signal at the response time.

In the implements of the present disclosure, after the synchronization phase is finished, the communication system may enter the detection phase, that is, the master device 100 obtains, according to the ultrasonic sweep signal of the corresponding controlled device, a detection result in each time slot in each detection cycle.

It can be known in combination with the foregoing, in the detection phase, it is needed to strictly ensure that the time when the ultrasonic sweep signal sent by each controlled device arrives the master device falls within the corresponding time slot. Therefore, after obtaining the detection timing sent by the master device, a controlled device end determines the response time for sending the response signal in combination with the foregoing obtained acoustic transmission time delay.

For example, taking the controlled device A in the example in FIG. 9 as an example, the detection timing, sent by the master device 100, received by the controlled device A represents that the master device 100 receives, in a corresponding time period of the time slot A, the response signal of the controlled device A. In this way, the controlled device A may determine, according to the detection timing and the self acoustic transmission time delay, a response time for sending the response signal and sends the ultrasonic sweep signal at the response time, so that it is ensured that the master device 100 receives the ultrasonic sweep signal in the corresponding time period of the time slot A, an error caused by the acoustic transmission time delay is eliminated or lowered, and the signal transmission precision is improved.

From the above, in the implements of the present disclosure, communication between the master device and the controlled device is achieved by using the ultrasonic signal with just multiplexing an existing hardware structure of a device and without additionally providing an ultra-wideband (UWB) module, lowering the cost, improving the detection precision and resulting in stronger universality. In addition, communication isolation between a plurality of controlled devices is achieved by employing a time division mode, so that the communication method is not limited by an acoustic communication bandwidth, may achieve communication connection between more controlled devices, and increases a capacity of a communication system. And, the detection result is determined based on the time difference between the ultrasonic sweep signal arriving the two microphones of the master device, which is simple in control logic and high in detection efficiency. By synchronizing the master device and various controlled devices in acoustic communication thread, the effect of a communication time delay between the master device and the controlled device is eliminated or weakened, the signal synchronization between the master device and the controlled device is ensured, and the communication precision is improved. By reallocating the second identification information according to the first identification information, the transmission data volume of the acoustic wave is reduced, and the transmission efficiency is improved.

Some implements of the present disclosure provide a communication system, including a master device and at least one controlled device; and the master device and various controlled devices are located in a same local area network.

The master device includes at least one acoustic emitter and at least two acoustic receivers; various acoustic receivers are disposed at different positions of the master device; and each controlled device includes at least acoustic emitter and at least one acoustic receiver, where the master device includes a first controller; the first controller includes a first memory and a first processor; the first memory stores computer instructions; and the computer instructions are used for enabling the first processor to execute the communication method according to any one of the above implements; and each controlled device includes a second controller; the second controller includes a second memory and a second processor; the second memory stores computer instructions; and the computer instructions are used for enabling the second processor to execute the communication method according to any one of the above implements.

In some implements, the communication system of the present disclosure may be seen in foregoing FIG. 1 and FIG. 2 and details are not described in the present disclosure.

From the above, in the implements of the present disclosure, communication between the master device and the controlled device is achieved by using the ultrasonic signal with just multiplexing an existing hardware structure of a device and without additionally providing an ultra-wideband (UWB) module, lowering the cost, improving the detection precision and resulting in stronger universality. In addition, communication isolation between a plurality of controlled devices is achieved by employing a time division mode, so that the communication method is not limited by an acoustic communication bandwidth, may achieve communication connection between more controlled devices, and increases a capacity of a communication system.

In some implements, the present disclosure provides a communication apparatus which may be applied to the foregoing master device 100.

Figure 13:
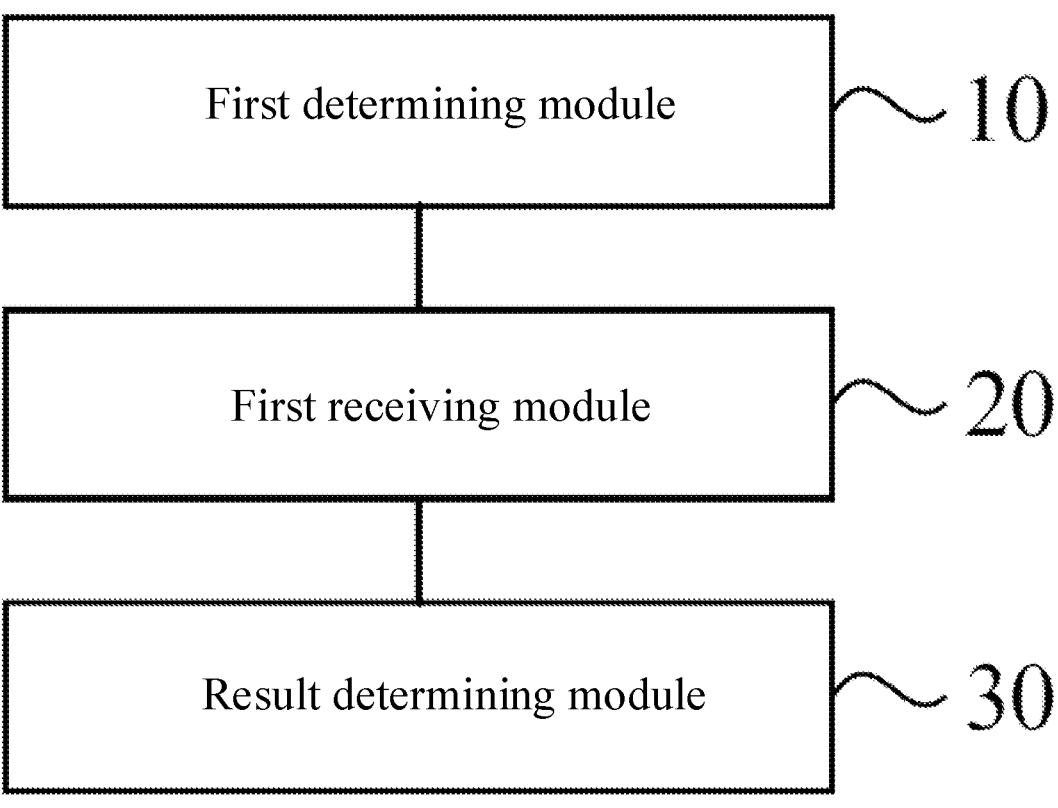
FIG. 13 is a structural block diagram of a communication apparatus according to some embodiments of the present disclosure.

As shown in FIG. 13, in some implements, the communication apparatus of the examples of the present disclosure includes:

a first determining module 10, configured to determine, according to the number of controlled devices and a preset time slot length, detection cycles and detection timing of various controlled devices in each detection cycle, the controlled devices and the master device are devices located in a same local area network;

a first receiving module 20, configured to receive, in each time slot in the detection cycle, an ultrasonic sweep signal sent by the controlled device; and a result determining module 30, configured to determine, according to the detection timing and the ultrasonic sweep signal, a detection result of the master device and the controlled device.

From the above, in the implements of the present disclosure, communication between the master device and the controlled device is achieved by using the ultrasonic signal with just multiplexing an existing hardware structure of a device and without additionally providing an ultra-wideband (UWB) module, lowering the cost, improving the detection precision and resulting in stronger universality. In addition, communication isolation between a plurality of controlled devices is achieved by employing a time division mode, so that the communication method is not limited by an acoustic communication bandwidth, may achieve communication connection between more controlled devices, and increases a capacity of a communication system.

In some implements, the result determining module 30 is configured to:

Determine, according to the detection timing, a target controlled device corresponding to the time slot in each time slot; and determine, according to the ultrasonic sweep signal received in the time slot, the detection result of the master device and the target controlled device.

In some implements, the result determining module 30 is configured to:

obtain a first ultrasonic sweep signal received by a first microphone of the master device in the time slot and a second ultrasonic sweep signal received by a second microphone of the master device in the time slot, the first microphone and the second microphone are disposed at different positions of the master device;

determine, according to the first ultrasonic sweep signal and the second ultrasonic sweep signal, a time difference between the first microphone and the second microphone receiving the first and second ultrasonic sweep signals; and determine, according to the time difference, the detection result of the master device and the target controlled device.

In some implements, the result determining module 30 is configured to:

obtain the time difference by performing correlation peak processing according to the first ultrasonic sweep signal and the second ultrasonic sweep signal.

In some implements, the result determining module 30 is configured to:

determine, in response to the time difference being smaller than a preset threshold, the detection result that the master device points to the target controlled device.

In some implements, the result determining module 30 is configured to:

determine, in response to the time difference being larger than or equal to the preset threshold, the detection result that the master device does not point to the target controlled device.

From the above, in the implements of the present disclosure, communication between the master device and the controlled device is achieved by using the ultrasonic signal with just multiplexing an existing hardware structure of a device and without additionally providing an ultra-wideband (UWB) module, lowering the cost, improving the detection precision and resulting in stronger universality. In addition, communication isolation between a plurality of controlled devices is achieved by employing a time division mode, so that the communication method is not limited by an acoustic communication bandwidth, may achieve communication connection between more controlled devices, and increases a capacity of a communication system. And, the detection result is determined based on the time difference between the ultrasonic sweep signal arriving the two microphones of the master device, which is simple in control logic and high in detection efficiency.

In some implements, the master device includes a mobile terminal; and the first microphone and the second microphone are disposed on the top and at the bottom of the mobile terminal respectively.

In some implements, the communication apparatus of the examples of the present disclosure further includes a first synchronization module, configured to:

send an ultrasonic synchronization signal to various controlled devices, and record a first time when the ultrasonic synchronization signal is sent, the ultrasonic synchronization signal includes timing information enabling a controlled device to return a response signal;

receive the response signals sent by various controlled devices, and record a second time when a response signal is received, the response signal is an ultrasonic signal generated, according to the timing information included in the ultrasonic synchronization signal, by the controlled device; and send the first time and the second time to the corresponding controlled device through an ultrasonic wave, the controlled device determines an acoustic transmission time delay according to the first time and the second time, the acoustic transmission time delay is an acoustic transmission time between the controlled device and the master device.

In some implements, the first synchronization module is configured to:

obtain first identification information of various controlled devices in a same local area network as the master device; and allocate, according to the first identification information, second identification information to each controlled device, a data volume of the second identification information is smaller than that of the first identification information.

From the above, in the implements of the present disclosure, by synchronizing the master device and various controlled devices in acoustic communication thread, the effect of a communication time delay between the master device and the controlled device is eliminated or weakened, the signal synchronization between the master device and the controlled device is ensured, and the communication precision is improved.

In some implements, the apparatus of the present disclosure further includes an interface display module, configured to:

output, in response to the detection result that the master device points to the controlled device, a control option card of the controlled device on a display interface of the master device.

From the above, in the implements of the present disclosure, communication between the master device and the controlled device is achieved by using the ultrasonic signal with just multiplexing an existing hardware structure of a device and without additionally providing an ultra-wideband (UWB) module, lowering the cost, improving the detection precision and resulting in stronger universality. In addition, communication isolation between a plurality of controlled devices is achieved by employing a time division mode, so that the communication method is not limited by an acoustic communication bandwidth, may achieve communication connection between more controlled devices, and increases a capacity of a communication system. And, the detection result is determined based on the time difference between the ultrasonic sweep signal arriving the two microphones of the master device, which is simple in control logic and high in detection efficiency. By synchronizing the master device and various controlled devices in acoustic communication thread, the effect of a communication time delay between the master device and the controlled device is eliminated or weakened, the signal synchronization between the master device and the controlled device is ensured, and the communication precision is improved. By reallocating the second identification information according to the first identification information, the transmission data volume of the acoustic wave is reduced, and the transmission efficiency is improved.

The implements of the present disclosure provide a communication apparatus which may be applied to the foregoing controlled device 200.

Figure 14:
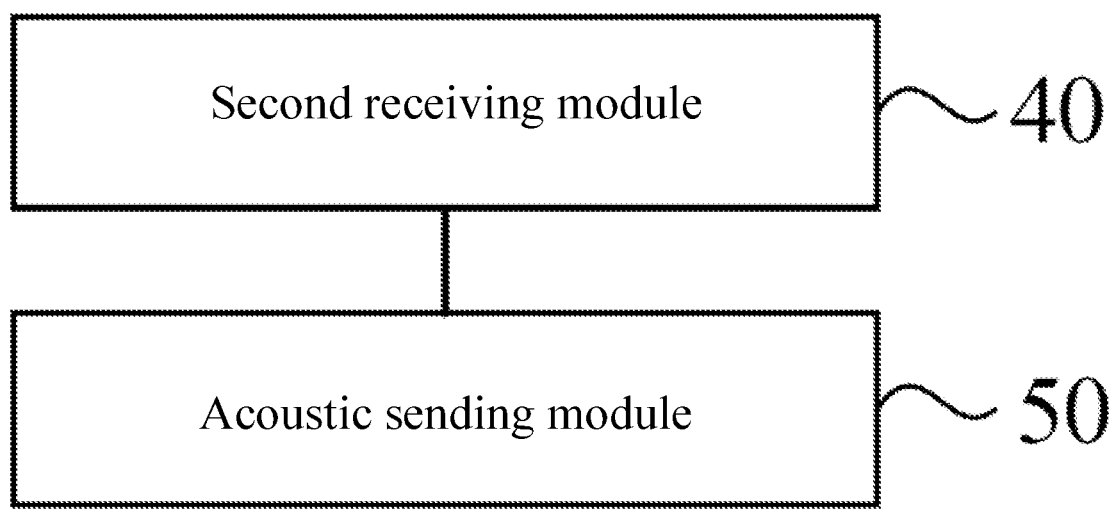
FIG. 14 is a structural block diagram of a communication apparatus according to some embodiments of the present disclosure.

As shown in FIG. 14, in some implements, the communication apparatus of the examples of the present disclosure includes:

a second receiving module 40, configured to receive detection timing, sent by a master device, of the controlled device in each detection cycle; and an acoustic sending module 50, configured to determine, according to the detection timing, a corresponding response time of the controlled device in each detection cycle, and send an ultrasonic sweep signal at the response time.

In some implements, the apparatus of the present disclosure further includes a second synchronization module, configured to:

receive an ultrasonic synchronization signal sent by the master device, and record a third time when the ultrasonic synchronization signal is received;

send, according to parsed timing information included in the ultrasonic synchronization signal, a response signal to the master device at a corresponding time, and record a fourth time when the response signal is sent; and receive an ultrasonic signal (comprising the first time and the second time) sent by the master device, and determine, according to the ultrasonic signal and the third time or the fourth time, an acoustic transmission time delay self, the first time is a time when the master device sends the ultrasonic synchronization signal; and the second time is a time when the master device receives the response signal.

From the above, in the implements of the present disclosure, by synchronizing the master device and various controlled devices in acoustic communication thread, the effect of a communication time delay between the master device and the controlled device is eliminated or weakened, the signal synchronization between the master device and the controlled device is ensured, and the communication precision is improved.

In some implements, the acoustic sending module 50 is configured to:

Determine, according to the detection timing and the acoustic transmission time delay, a corresponding response time of the controlled device in each detection cycle.

In some implements, the present disclosure provides a storage medium, storing computer instructions, the computer instructions are used for enabling a computer to execute the communication method according to any one of the foregoing implements.

Figure 15:
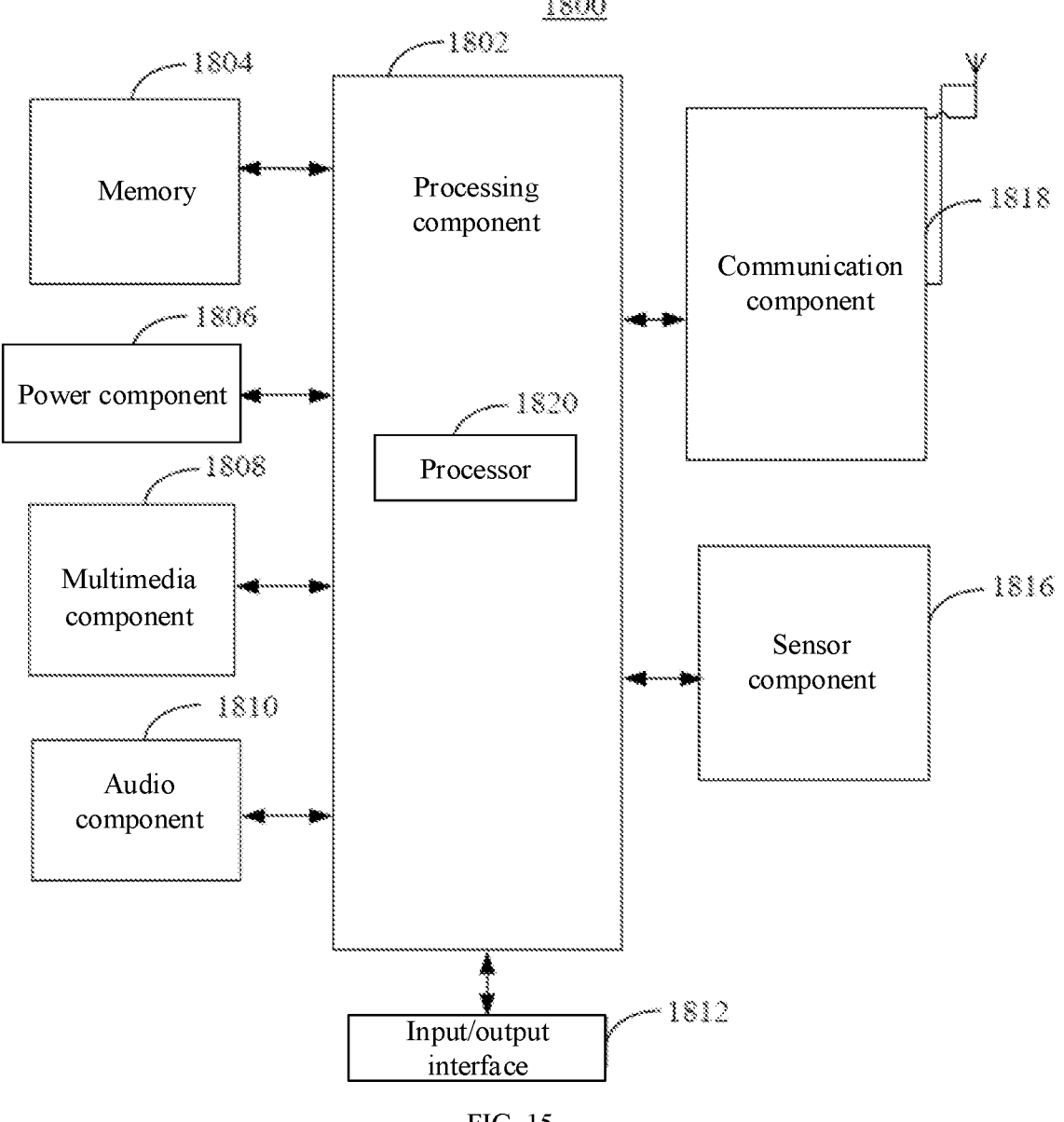
FIG. 15 is a structural block diagram of an electronic device according to some embodiments of the present disclosure.

FIG. 15 shows a structural block diagram of an electronic device according to some implements of the present disclosure. The electronic device may serve as the foregoing master device or the foregoing controlled device, which is not limited to the present disclosure. The related principles of the electronic device and storage medium in some implements of the present disclosure are described below in combination with FIG. 15.

Referring to FIG. 15, the electronic device 1800 may include one or more of the following components: a processing component 1802, a memory 1804, a power component 1806, a multimedia component 1808, an audio component 1810, an input/output (I/O) interface 1812, a sensor component 1816 and a communication component 1818.

The processing component 1802 generally controls the overall operations of the electronic device 1800, such as operations associated with display, telephone calls, data communications, camera operations and recording operations. The processing component 1802 may include one or more processors 1820 to execute instructions. In addition, the processing component 1802 may include one or more modules to facilitate the interaction between the processing component 1802 and other components. For example, the processing component 1802 may include a multimedia module to facilitate interaction between the multimedia component 1808 and the processing component 1802. For another example, the processing component 1802 may read an executable instruction from the memory, so as to achieve a function related to the electronic device.

The memory 1804 is configured to store various types of data to support operations at the electronic device 1800. Examples of these data include instructions for any application or method operated on the electronic device 1800, contact data, phone book data, messages, pictures, videos, etc. The memory 1804 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1806 provides power to various components of the electronic device 1800. The power component 1806 may include a power management system, one or more power supplies, and other components associated with the generation, management, and distribution of power for the electronic device 1800.

The multimedia component 1808 includes a display screen that provides an output interface between the electronic device 1800 and the user. In some embodiments, the multimedia component 1808 includes a front camera and/or a rear camera. When the device 1800 is in an operation mode, such as a shooting mode or a video mode, the front camera and/or the rear camera may receive external multimedia data. Each front or rear camera may be a fixed optical lens system or have a focal length and optical zoom capability.

The audio component 1810 is configured to output and/or input an audio signal. For example, the audio component 1810 includes a microphone (MIC), which is configured to receive external audio signals when the electronic device 1800 is in an operation mode, such as a call mode, a recording mode and a voice recognition mode. The received audio signals may be further stored in the memory 1804 or sent by the communication component 1818. In some examples, the audio component 1810 further includes a speaker for outputting audio signals.

The I/O interface 1812 provides an interface between the processing component 1802 and a peripheral interface module. The peripheral interface module may be a keyboard, a click wheel, buttons, etc. These buttons may include, but are not limited to a home button, a volume button, a start button, and a lock button.

The sensor component 1816 includes one or more sensors for providing various aspects of status assessment for the electronic device 1800. For example, the sensor component 1816 may detect an on/off state of the electronic device 1800, and relative positioning of components, for example, the components are the display and keypad of the electronic device 1800. The sensor component 1816 may further detect a change of position of the electronic device 1800 or one component of the electronic device 1800, whether the user touches the electronic device 1800, an orientation or acceleration/deceleration of the electronic device 1800, and a temperature variation of the electronic device 1800. The sensor component 1816 may include a proximity sensor configured to detect the presence of nearby objects without any physical contact. The sensor component 1816 may also include an optical sensor, such as a CMOS or CCD image sensor, for use in imaging applications. In some examples, the sensor component 1816 may further include an acceleration sensor, a gyroscope sensor, a magnetic sensor, a pressure sensor, or a temperature sensor.

The communication component 1818 is configured to facilitate wired or wireless communication between the electronic device 1800 and other devices. The electronic device 1800 may access wireless networks based on communication standards, such as Wi-Fi, 2G, 3G, 4G, 5G or 6G, or a combination of the above. In an example, the communication component 1818 receives broadcast signals or broadcast associated information from an external broadcast management system through a broadcast channel. In an example, the communication component 1818 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In an example, the electronic device 1800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements.

Apparently, the above-described implements are examples for clear description, but not being as limiting to the implementations. To those of ordinary skill in the art, various other modifications or variations can further be made on the basis of the above description. All implements need not be, and cannot be, exhaustive herein. Obvious modifications or variations extended therefrom are still in the protection scope of the present disclosure.

According to a first aspect of the examples of the present disclosure, a communication method is provided. The communication method is applied to a master device and includes:

> determining, according to the number of controlled devices and a preset time slot length, detection cycles and detection timing of various controlled devices in each detection cycle, the controlled devices and the master device are devices located in a same local area network;
> receiving, in each time slot in the detection cycle, an ultrasonic sweep signal sent by the controlled device; and
> determining, according to the detection timing and the ultrasonic sweep signal, a detection result of the master device and the controlled device.

In some implements, determining, according to the detection timing and the ultrasonic sweep signal, a detection result of the master device and the controlled device includes:

> determining, according to the detection timing, a target controlled device corresponding to the time slot in each time slot; and
> determining, according to the ultrasonic sweep signal received in the time slot, the detection result of the master device and the target controlled device.

In some implements, determining, according to the ultrasonic sweep signal received in the time slot, the detection result of the master device and the target controlled device includes:

> obtaining a first ultrasonic sweep signal received by a first microphone of the master device in the time slot and a second ultrasonic sweep signal received by a second microphone of the master device in the time slot, the first microphone and the second microphone are disposed at different positions of the master device;
> determining, according to the first ultrasonic sweep signal and the second ultrasonic sweep signal, a time difference between the first microphone and the second microphone receiving the first and second ultrasonic sweep signals; and
> determining, according to the time difference, the detection result of the master device and the target controlled device.

In some implements, determining, according to the first ultrasonic sweep signal and the second ultrasonic sweep signal, a time difference between the first microphone and the second microphone receiving the first and second ultrasonic sweep signals includes:

> obtaining the time difference by performing correlation peak processing according to the first ultrasonic sweep signal and the second ultrasonic sweep signal.

In some implements, determining, according to the time difference, the detection result of the master device and the target controlled device includes:

determining, in response to the time difference being smaller than a preset threshold, the detection result that the master device points to the target controlled device.

In some implements, determining, according to the time difference, the detection result of the master device and the target controlled device includes:

determining, in response to the time difference being larger than or equal to the preset threshold, the detection result that the master device does not point to the target controlled device.

In some implements, the master device includes a mobile terminal; and the first microphone and the second microphone are disposed on the top and at the bottom of the mobile terminal respectively.

In some implements, before determining, according to the number of the controlled devices and the preset time slot length, the detection cycles and the detection timing of various controlled devices in each detection cycle, the method further includes:

sending an ultrasonic synchronization signal to various controlled devices, and recording a first time when the ultrasonic synchronization signal is sent, the ultrasonic synchronization signal includes timing information enabling each controlled device to return a response signal;

receiving the response signals sent by various controlled devices, and recording a second time when each response signal is received, the response signal is an ultrasonic signal generated, according to the timing information included in the ultrasonic synchronization signal, by the controlled device; and sending the first time and the second time to the corresponding controlled device through an ultrasonic wave, so that the controlled device determines an acoustic transmission time delay according to the first time and the second time, the acoustic transmission time delay is an acoustic transmission time between the controlled device and the master device.

In some implements, before sending an ultrasonic synchronization signal to various controlled devices, and recording a first time when the ultrasonic synchronization signal is sent, the method further includes:

obtaining first identification information of various controlled devices in a same local area network as the master device; and allocating, according to the first identification information, second identification information to each controlled device, a data volume of the second identification information is smaller than that of the first identification information.

In some implements, the communication method of the present disclosure further includes:

outputting, in response to the detection result that the master device points to the controlled device, a control option card of the controlled device on a display interface of the master device.

According to a second aspect of the examples of the present disclosure, a communication method is provided. The method communication is applied to a controlled device and includes:

receiving detection timing, sent by the master device, of the controlled device in each detection cycle; and determining, according to the detection timing, a corresponding response time of the controlled device in each detection cycle, and sending an ultrasonic sweep signal at the response time.

In some implements, the communication method of the present disclosure further includes:

receiving an ultrasonic synchronization signal sent by the master device, and recording a third time when the ultrasonic synchronization signal is received;

sending, according to parsed timing information included in the ultrasonic synchronization signal, a response signal to the master device at a corresponding time, and recording a fourth time when the response signal is sent; and receiving an ultrasonic signal comprising the first time and the second time sent by the master device, and determining, according to the ultrasonic signal and the third time or the fourth time, an acoustic transmission time delay self, the first time is a time when the master device sends the ultrasonic synchronization signal; and the second time is a time when the master device receives the response signal.

In some implements, determining, according to the detection timing, a corresponding response time of the controlled device in each detection cycle includes:

determining, according to the detection timing and the acoustic transmission time delay, a corresponding response time of the controlled device in each detection cycle.

According to a third aspect of the examples of the present disclosure, a communication system is provided, including:

a master device, including at least one acoustic emitter and at least two acoustic receivers, the at least two acoustic receivers being disposed at different positions of the master device; and at least one controlled device, each including at least one acoustic emitter and at least one acoustic receiver, the master device and the at least one controlled device being in a same local area network, where the master device includes a first controller, the first controller includes a first memory and a first processor, the first memory stores computer instructions, and the computer instructions are used for enabling the first processor to execute the communication method according to any one in the first aspect; and each controlled device includes a second controller, the second controller includes a second memory and a second processor, the second memory stores computer instructions, and the computer instructions are used for enabling the second processor to execute the communication method according to any one in the second aspect.

In some embodiments, the master device includes a mobile terminal, and the controlled device includes an intelligent home device.

According to a fourth aspect of the examples of the present disclosure, a communication apparatus is provided. The communication apparatus is applied to a master device and includes:

a first determining module, configured to determine, according to the number of controlled devices and a preset time slot length, detection cycles and detection timing of various controlled devices in each detection cycle, the controlled devices and the master device are devices located in a same local area network;

a first receiving module, configured to receive, in each time slot in the detection cycle, an ultrasonic sweep signal sent by the controlled device; and a result determining module, configured to determine, according to the detection timing and the ultrasonic sweep signal, a detection result of the master device and the controlled device.

In some implements, the result determining module is configured to:

determine, according to the detection timing, a target controlled device corresponding to the time slot in each time slot; and determine, according to the ultrasonic sweep signal received in the time slot, the detection result of the master device and the target controlled device.

In some implements, the result determining module is configured to:

obtain a first ultrasonic sweep signal received by a first microphone of the master device in the time slot and a second ultrasonic sweep signal received by a second microphone of the master device in the time slot, the first microphone and the second microphone are disposed at different positions of the master device;

determine, according to the first ultrasonic sweep signal and the second ultrasonic sweep signal, a time difference between the first microphone and the second microphone receiving the first and second ultrasonic sweep signals; and determine, according to the time difference, the detection result of the master device and the target controlled device.

In some implements, the result determining module is configured to:

obtain the time difference by performing correlation peak processing according to the first ultrasonic sweep signal and the second ultrasonic sweep signal.

In some implements, the result determining module is configured to:

determine, in response to the time difference being smaller than a preset threshold, the detection result that the master device points to the controlled device.

In some implements, the result determining module is configured to:

determine, in response to the time difference being larger than or equal to the preset threshold, the detection result that the master device does not point to the controlled device.

In some implements, the master device includes a mobile terminal; and the first microphone and the second microphone are disposed on the top and at the bottom of the mobile terminal respectively.

In some implements, the apparatus of the present disclosure further includes a first synchronization module, configured to:

send an ultrasonic synchronization signal to various controlled devices, and record a first time when the ultrasonic synchronization signal is sent, the ultrasonic synchronization signal includes timing information enabling each controlled device to return a response signal;

receive the response signals sent by various controlled devices, and record a second time when each response signal is received, the response signal is an ultrasonic signal generated, according to the timing information included in the ultrasonic synchronization signal, by the controlled device; and send the first time and the second time to the corresponding controlled device through an ultrasonic wave, the controlled device determines an acoustic transmission time delay according to the first time and the second time, the acoustic transmission time delay is an acoustic transmission time between the controlled device and the master device.

In some implements, the first synchronization module is configured to:

obtain first identification information of various controlled devices in a same local area network as the master device; and allocate, according to the first identification information, second identification information to each controlled device, a data volume of the second identification information is smaller than that of the first identification information.

In some implements, the apparatus of the present disclosure further includes an interface display module, configured to:

output, in response to the detection result that the master device points to the controlled device, a control option card of the controlled device on a display interface of the master device.

According to a fifth aspect of the examples of the present disclosure, a communication apparatus is provided. The communication apparatus is applied to a controlled device and includes:

a second receiving module, configured to receive detection timing, sent by a master device, of the controlled device in each detection cycle; and an acoustic sending module, configured to determine, according to the detection timing, a corresponding response time of the controlled device in each detection cycle, and send an ultrasonic sweep signal at the response time.

In some implements, the apparatus of the present disclosure further includes a second synchronization module, configured to:

receive an ultrasonic synchronization signal sent by the master device, and record a third time when the ultrasonic synchronization signal is received;

send, according to parsed timing information included in the ultrasonic synchronization signal, a response signal to the master device at a corresponding time, and record a fourth time when the response signal is sent; and receive an ultrasonic signal comprising the first time and the second time sent by the master device, and determine, according to the ultrasonic signal and the third time or the fourth time, an acoustic transmission time delay self, the first time is a time when the master device sends the ultrasonic synchronization signal; and the second time is a time when the master device receives the response signal.

In some implements, the acoustic sending module is configured to:

determine, according to the detection timing and the acoustic transmission time delay, a corresponding response time of the controlled device in each detection cycle.

According to a sixth aspect of the examples of the present disclosure, a storage medium is provided, storing computer instructions, the computer instructions are used for enabling a computer to execute the method according to any one of the implements in the first aspect or the second aspect.

The invention claimed is:

1. A communication method, performed by a master device, comprising:

determining, according to a number of controlled devices and a preset time slot length, detection cycles and detection timing of various controlled devices in a detection cycle, wherein the controlled devices and the master device are devices located in a same local area network, and a time length of the detection cycle is a product of the preset time slot length and the number of the controlled devices;

receiving, in a time slot in the detection cycle, an ultrasonic sweep signal sent by the controlled device; and determining, according to the detection timing and the ultrasonic sweep signal, a detection result of the master device and the controlled device;

wherein the communication method further comprises:

sending an ultrasonic synchronization signal to the various controlled devices, and recording a first time in response to determining that the ultrasonic synchronization signal is sent, wherein the ultrasonic synchronization signal comprises timing information enabling the controlled device to return a response signal and second identification information of the controlled device;

receiving the response signals sent by the various controlled devices, and recording a second time in response to determining that the response signal is received, wherein the response signal is an ultrasonic signal generated, according to the timing information comprised in the ultrasonic synchronization signal, by the controlled device; and sending the first time and the second time to a corresponding controlled device through an ultrasonic wave, wherein the corresponding controlled device determines an acoustic transmission time delay according to the first time and the second time, wherein the acoustic transmission time delay is an acoustic transmission time between the corresponding controlled device and the master device;

wherein the communication method further comprises:

obtaining first identification information of the various controlled devices in the same local area network as the master device; and allocating, according to the first identification information, the second identification information to the controlled device, wherein a data volume of the second identification information is smaller than that of the first identification information.

2. The communication method according to claim 1, wherein the determining, according to the detection timing and the ultrasonic sweep signal, the detection result of the master device and the controlled device comprises:

determining, according to the detection timing, a target controlled device corresponding to the time slot in the time slot; and determining, according to the ultrasonic sweep signal received in the time slot, the detection result of the master device and the target controlled device.

3. The communication method according to claim 2, wherein determining, according to the ultrasonic sweep signal received in the time slot, the detection result of the master device and the target controlled device comprises:

obtaining a first ultrasonic sweep signal received by a first microphone of the master device in the time slot and a second ultrasonic sweep signal received by a second microphone of the master device in the time slot, wherein the first microphone and the second microphone are disposed at different positions of the master device;

determining, according to the first ultrasonic sweep signal and the second ultrasonic sweep signal, a time difference between the first microphone and the second microphone receiving the first and second ultrasonic sweep signals; and determining, according to the time difference, the detection result of the master device and the target controlled device.

4. The communication method according to claim 3, wherein determining, according to the first ultrasonic sweep signal and the second ultrasonic sweep signal, the time difference between the first microphone and the second microphone receiving the first and second ultrasonic sweep signals comprises:

obtaining the time difference by performing correlation peak processing according to the first ultrasonic sweep signal and the second ultrasonic sweep signal.

5. The communication method according to claim 3, wherein determining, according to the time difference, the detection result of the master device and the target controlled device comprises:

determining, in response to the time difference being smaller than a preset threshold, the detection result that the master device points to the target controlled device.

6. The communication method according to claim 3, wherein determining, according to the time difference, the detection result of the master device and the target controlled device comprises:

determining, in response to the time difference being larger than or equal to a preset threshold, the detection result that the master device does not point to the target controlled device.

7. The communication method according to claim 3, wherein the master device comprises a mobile terminal, and the first microphone and the second microphone are disposed on a top and at a bottom of the mobile terminal respectively.

8. The communication method according to claim 1, wherein the communication method further comprises:

outputting, in response to the detection result that the master device points to the controlled device, a control option card of the controlled device on a display interface of the master device.

9. A communication method, performed by a controlled device, comprising:

receiving detection timing, sent by a master device, of the controlled device in a detection cycle; and determining, according to the detection timing, a corresponding response time of the controlled device in the detection cycle, and sending an ultrasonic sweep signal at the corresponding response time;

wherein the communication method further comprises:

receiving an ultrasonic synchronization signal sent by the master device, and recording a third time in response to determining that the ultrasonic synchronization signal is received; wherein the ultrasonic synchronization signal comprises second identification information of the controlled device;

sending, according to parsed timing information comprised in the ultrasonic synchronization signal, a response signal to the master device at a corresponding time, and recording a fourth time in response to determining that the response signal is sent; and receiving an ultrasonic signal comprising a first time and a second time sent by the master device, and determining, according to the ultrasonic signal and the third time or the fourth time, an acoustic transmission time delay self, wherein the first time is a time in response to determining that the master device sends the ultrasonic synchronization signal; and the second time is a time in response to determining that the master device receives the response signal;

wherein the second identification information is allocated by the master device to a controlled device according to first identification information, a data volume of the second identification information is smaller than that of the first identification information, the controlled device is in the same local area network as the master device, the first identification information is identification information of the controlled device obtained by the master device, and a time length of the detection cycle is a product of a preset time slot length and a number of controlled devices in the same local area network as the master device.

10. The communication method according to claim 9, wherein determining, according to the detection timing, the corresponding response time of the controlled device in the detection cycle comprises:

determining, according to the detection timing and the acoustic transmission time delay self, the corresponding response time of the controlled device in the detection cycle.

11. A communication system, comprising:

a master device, comprising at least one acoustic emitter and at least two acoustic receivers, the at least two acoustic receivers being disposed at different positions of the master device; and at least one controlled device, comprising at least one acoustic emitter and at least one acoustic receiver, the master device and the at least one controlled device being in a same local area network, wherein the master device comprises a first controller, the first controller comprises a first memory and one or more first processors, the first memory stores computer instructions, and in response to determining that the computer instructions are executed by the one or more first processors, the one or more first processors are collectively configured to: determine, according to a number of controlled devices and a preset time slot length, detection cycles and detection timing of various controlled devices in a detection cycle, wherein the controlled devices and the master device are devices located in the same local area network, and a time length of the detection cycle is a product of the preset time slot length and the number of the controlled devices; receive, in a time slot in the detection cycle, an ultrasonic sweep signal sent by the controlled device; and determine, according to the detection timing and the ultrasonic sweep signal, a detection result of the master device and the controlled device; and a controlled device comprises a second controller, the second controller comprises a second memory and one or more second processors, the second memory stores computer instructions, and the computer instructions are executed by the one or more second processors, the one or more second processors are collectively configured to: receive the detection timing, sent by the master device of the controlled device in the detection cycle; and determine, according to the detection timing, a corresponding response time of the controlled device in the detection cycle, and sending the ultrasonic sweep signal at the response time;

wherein the master device comprises the first controller, the first controller comprises the first memory and the one or more first processors, the first memory stores the computer instructions, and in response to determining that the computer instructions are executed by the one or more first processors, the one or more first processors are collectively configured to: send an ultrasonic synchronization signal to the various controlled devices, and record a first time in response to determining that the ultrasonic synchronization signal is sent, wherein the ultrasonic synchronization signal comprises timing information enabling the controlled device to return a response signal and second identification information of the controlled device; receive the response signals sent by the various controlled devices, and record a second time in response to determining that the response signal is received, wherein the response signal is an ultrasonic signal generated, according to the timing information comprised in the ultrasonic synchronization signal, by the controlled device; and send the first time and the second time to a corresponding controlled device through an ultrasonic wave, wherein the corresponding controlled device determines an acoustic transmission time delay according to the first time and the second time, wherein the acoustic transmission time delay is an acoustic transmission time between the corresponding controlled device and the master device;

wherein the master device comprises the first controller, the first controller comprises the first memory and the one or more first processors, the first memory stores the computer instructions, and in response to determining that the computer instructions are executed by the one or more first processors, the one or more first processors are collectively configured to: obtain first identification information of the various controlled devices in the same local area network as the master device; and allocate, according to the first identification information, the second identification information to the controlled device, wherein a data volume of the second identification information is smaller than that of the first identification information; and wherein the controlled device comprises the second controller, the second controller comprises the second memory and the one or more second processors, the second memory stores the computer instructions, and the computer instructions are executed by the one or more second processors, the one or more second processors are collectively configured to: receive the ultrasonic synchronization signal sent by the master device, and record a third time in response to determining that the ultrasonic synchronization signal is received; wherein the ultrasonic synchronization signal comprises the second identification information of the controlled device; send, according to parsed timing information comprised in the ultrasonic synchronization signal, the response signal to the master device at a corresponding time, and record a fourth time in response to determining that the response signal is sent; and receive the ultrasonic signal comprising the first time and the second time sent by the master device, and determine, according to the ultrasonic signal and the third time or the fourth time, an acoustic transmission time delay self, wherein the first time is a time in response to determining that the master device sends the ultrasonic synchronization signal; the second time is a time in response to determining that the master device receives the response signal; the second identification information is allocated by the master device to the controlled device according to the first identification information, the data volume of the second identification information is smaller than that of the first identification information, the controlled device is in the same local area network as the master device, the first identification information is identification information of the controlled device obtained by the master device, and the time length of the detection cycle is the product of the preset time slot length and the number of the controlled devices in the same local area network as the master device.

12. The communication system according to claim 11, wherein
the master device comprises a mobile terminal, and the controlled device comprises an intelligent home device.

13. The communication system according to claim 11, wherein the master device comprises the first controller, the first controller comprises the first memory and the one or more first processors, the first memory stores the computer instructions, and in response to determining that the computer instructions are executed by the one or more first processors, the one or more first processors are collectively configured to:

determine, according to the detection timing, a target controlled device corresponding to the time slot in the time slot; and determine, according to the ultrasonic sweep signal received in the time slot, the detection result of the master device and the target controlled device.

14. The communication system according to claim 13, wherein the master device comprises the first controller, the first controller comprises the first memory and the one or more first processors, the first memory stores the computer instructions, and in response to determining that the computer instructions are executed by the one or more first processors, the one or more first processors are collectively configured to:

obtain a first ultrasonic sweep signal received by a first microphone of the master device in the time slot and a second ultrasonic sweep signal received by a second microphone of the master device in the time slot, wherein the first microphone and the second microphone are disposed at different positions of the master device;

determine, according to the first ultrasonic sweep signal and the second ultrasonic sweep signal, a time difference between the first microphone and the second microphone receiving the first and second ultrasonic sweep signals; and determine, according to the time difference, the detection result of the master device and the target controlled device.

15. The communication system according to claim 14, wherein the master device comprises the first controller, the first controller comprises the first memory and the one or more first processors, the first memory stores the computer instructions, and in response to determining that the computer instructions are executed by the one or more first processors, the one or more first processors are collectively configured to:

obtain the time difference by performing correlation peak processing according to the first ultrasonic sweep signal and the second ultrasonic sweep signal.

16. A non-transitory computer-readable storage medium on which computer instructions are stored, wherein the computer instructions are used for enabling a computer to execute the communication method according to claim 1.

17. A non-transitory computer-readable storage medium on which computer instructions are stored, wherein the computer instructions are used for enabling a computer to execute the communication method according to claim 9.

* * * * *